US012784744B2

(12) United States Patent
Sharifi et al.

(10) Patent No.: US 12,784,744 B2
(45) **Date of Patent: *Nov. 3, 2026**

(54) GENERATION OF INTERACTIVE AUDIO TRACKS FROM VISUAL CONTENT

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 18/938,126

(22) Filed: Nov. 5, 2024

(65) Prior Publication Data

US 2025/0061892 A1 Feb. 20, 2025

Related U.S. Application Data

(63) Continuation of application No. 17/282,135, filed as application No. PCT/US2020/036749 on Jun. 9, 2020, now Pat. No. 12,230,252.

(51) Int. Cl.
*G10L 15/08* (2006.01)
*G06F 3/16* (2006.01)
(Continued)

(52) U.S. Cl.
CPC ............ *G10L 15/083* (2013.01); *G06F 3/167* (2013.01); *G06V 20/64* (2022.01); *G10L 15/063* (2013.01);
(Continued)

(58) Field of Classification Search
CPC . G10L 15/083; G10L 15/063; G10L 15/1822; G10L 15/22; G10L 15/26; G10L 2015/088; G06F 3/167; G06V 20/64
See application file for complete search history.

(56) References Cited

U.S. PATENT DOCUMENTS 10,141,006 B1 * 11/2018 Burciu ................. G09B 21/006
11,722,571 B1 * 8/2023 Chenier .................. G10L 17/22 709/224
(Continued)

FOREIGN PATENT DOCUMENTS

CN 1549999 11/2004
CN 107464561 12/2017
(Continued)

OTHER PUBLICATIONS

Chinese Search Report for Corresponding Application No. 202080005699.4, dated Jun. 9, 2020, 8 pages.
(Continued)

*Primary Examiner* — Anne L Thomas-Homescu
(74) *Attorney, Agent, or Firm* — DORITY & MANNING, P.A.

(57) ABSTRACT

Generating audio tracks is provided. The system selects a digital component object having a visual output format. The system determines to convert the digital component object into an audio output format. The system generates text for the digital component object. The system selects, based on context of the digital component object, a digital voice to render the text. The system constructs a baseline audio track of the digital component object with the text rendered by the digital voice. The system generates, based on the digital component object, non-spoken audio cues. The system combines the non-spoken audio cues with the baseline audio form of the digital component object to generate an audio track of the digital component object. The system provides the audio track of the digital component object to the computing device for output via a speaker of the computing device.

20 Claims, 3 Drawing Sheets

(51) Int. Cl.

| | |
|---|---|
| ***G06V 20/64*** | (2022.01) |
| ***G10L 15/06*** | (2013.01) |
| ***G10L 15/18*** | (2013.01) |
| ***G10L 15/22*** | (2006.01) |
| ***G10L 15/26*** | (2006.01) |

(52) U.S. Cl.
CPC .......... *G10L 15/1822* (2013.01); *G10L 15/22* (2013.01); *G10L 15/26* (2013.01); *G10L 2015/088* (2013.01)

(56) References Cited

U.S. PATENT DOCUMENTS

| | | | | |
|---|---|---|---|---|
| 11,727,918 | B2 * | 8/2023 | Moreno | G06F 3/167 704/244 |
| 11,930,050 | B2 | 3/2024 | Lewis et al. | |
| 2009/0254345 | A1 * | 10/2009 | Fleizach | G10L 13/00 704/260 |
| 2011/0047163 | A1 * | 2/2011 | Chechik | G06F 16/78 707/E17.071 |
| 2014/0012586 | A1 * | 1/2014 | Rubin | G10L 17/24 704/E21.001 |
| 2014/0380149 | A1 * | 12/2014 | Gallo | G06F 40/143 715/234 |
| 2016/0048561 | A1 * | 2/2016 | Jones | G06F 16/2455 707/722 |
| 2017/0229040 | A1 * | 8/2017 | Joshi | G06F 3/165 |
| 2018/0096675 | A1 | 4/2018 | Nygaard et al. | |
| 2018/0157745 | A1 | 6/2018 | Williams et al. | |
| 2020/0357386 | A1 * | 11/2020 | Gao | G10L 15/08 |
| 2020/0365148 | A1 * | 11/2020 | Ji | G10L 15/30 |
| 2021/0056961 | A1 | 2/2021 | Ding et al. | |
| 2021/0151038 | A1 * | 5/2021 | Manjunath | G10L 15/1815 |

FOREIGN PATENT DOCUMENTS

| | | | |
|---|---|---|---|
| CN | 107516511 | 12/2017 | |
| CN | 109392309 | 2/2019 | |
| CN | 110753927 | 2/2020 | |
| GB | 201714754 | 7/2018 | |
| JP | 2015135494 | 7/2015 | |
| WO | WO 2019/216969 | 11/2019 | |
| WO | WO-2019216969 A1 * | 11/2019 | H04L 63/102 |

OTHER PUBLICATIONS

Chinese Search Report for Corresponding Application No. 2024108254245, dated Jun. 9, 2020, 3 pages.

International Preliminary Report on Patentability for PCT/US2020/036749, mailed on Dec. 22, 2022, 19 pages.

International Search Report and Written Opinion for PCT/US2020/036749, dated Feb. 23, 2021, 26 pages.

International Search Report for PCT/US2020/036749, mailed on Jun. 9, 2020, 21 pages.

* cited by examiner

GENERATION OF INTERACTIVE AUDIO TRACKS FROM VISUAL CONTENT

PRIORITY CLAIM

The present application is a continuation of U.S. patent application Ser. No. 17/282,135, having a filing date of Apr. 1, 2021, which is the National Stage of International Application No. PCT/US2020/036749, filed on Jun. 9, 2020. Applicant claims priority to and the benefit of each of such applications and incorporate all such applications herein by reference in its entirety.

BACKGROUND

A data processing system can provide digital content to a computing device to cause the computing device to present the digital content. The digital content can include visual content, which the computing device can present via a display. The digital content can include audio content, which the computing device can output via a speaker.

SUMMARY

At least one aspect of this technical solution is directed to a system to generate audio tracks. The system can include a data processing system. The data processing system can include one or more processors. The data processing system can receive, via a network, data packets comprising an input audio signal detected by a microphone of a computing device remote from the data processing system. The data processing system can parse the input audio signal to identify a request. The data processing system can select, based on the request, a digital component object having a visual output format, the digital component object associated with metadata. The data processing system can determine, based on a type of the computing device, to convert the digital component object into an audio output format. The data processing system can generate, responsive to the determination to convert the digital component object into the audio output format, text for the digital component object. The data processing system can select, based on context of the digital component object, a digital voice to render the text. The data processing system can construct a baseline audio track of the digital component object with the text rendered by the digital voice. The data processing system can generate, based on the metadata of the digital component object, non-spoken audio cues. The data processing system can combine the non-spoken audio cues with the baseline audio form of the digital component object to generate an audio track of the digital component object. The data processing system can provide, responsive to the request from the computing device, the audio track of the digital component object to the computing device for output via a speaker of the computing device.

At least one aspect of this technical solution is directed to a method of generating audio tracks. The method can be performed by one or more processors of a data processing system. The method can include the data processing system receiving data packets comprising an input audio signal detected by a microphone of a computing device remote from the data processing system. The method can include the data processing system parsing the input audio signal to identify a request. The method can include the data processing system selecting, based on the request, a digital component object having a visual output format, the digital component object associated with metadata. The method can include the data processing system determining, based on a type of the computing device, to convert the digital component object into an audio output format. The method can include the data processing system generating, responsive to the determination to convert the digital component object into the audio output format, text for the digital component object. The method can include the data processing system selecting, based on context of the digital component object, a digital voice to render the text. The method can include the data processing system constructing a baseline audio track of the digital component object with the text rendered by the digital voice. The method can include the data processing system generating, based on the digital component object, non-spoken audio cues. The method can include the data processing system combining the non-spoken audio cues with the baseline audio form of the digital component object to generate an audio track of the digital component object. The method can include the data processing system providing, responsive to the request from the computing device, the audio track of the digital component object to the computing device for output via a speaker of the computing device.

At least one aspect of this technical solution is directed to a system to generate audio tracks. The system can include a data processing system with one or more processors. The data processing system can identify keywords associated with digital streaming content rendered by a computing device. The data processing system can select, based on the keywords, a digital component object having a visual output format, the digital component object associated with metadata. The data processing system can determine, based on a type of the computing device, to convert the digital component object into an audio output format. The data processing system can generate, responsive to the determination to convert the digital component object into the audio output format, text for the digital component object. The data processing system can select, based on context of the digital component object, a digital voice to render the text. The data processing system can construct a baseline audio track of the digital component object with the text rendered by the digital voice. The data processing system can generate, based on the digital component object, non-spoken audio cues. The data processing system can combine the non-spoken audio cues with the baseline audio form of the digital component object to generate an audio track of the digital component object. The data processing system can provide the audio track of the digital component object to the computing device for output via a speaker of the computing device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
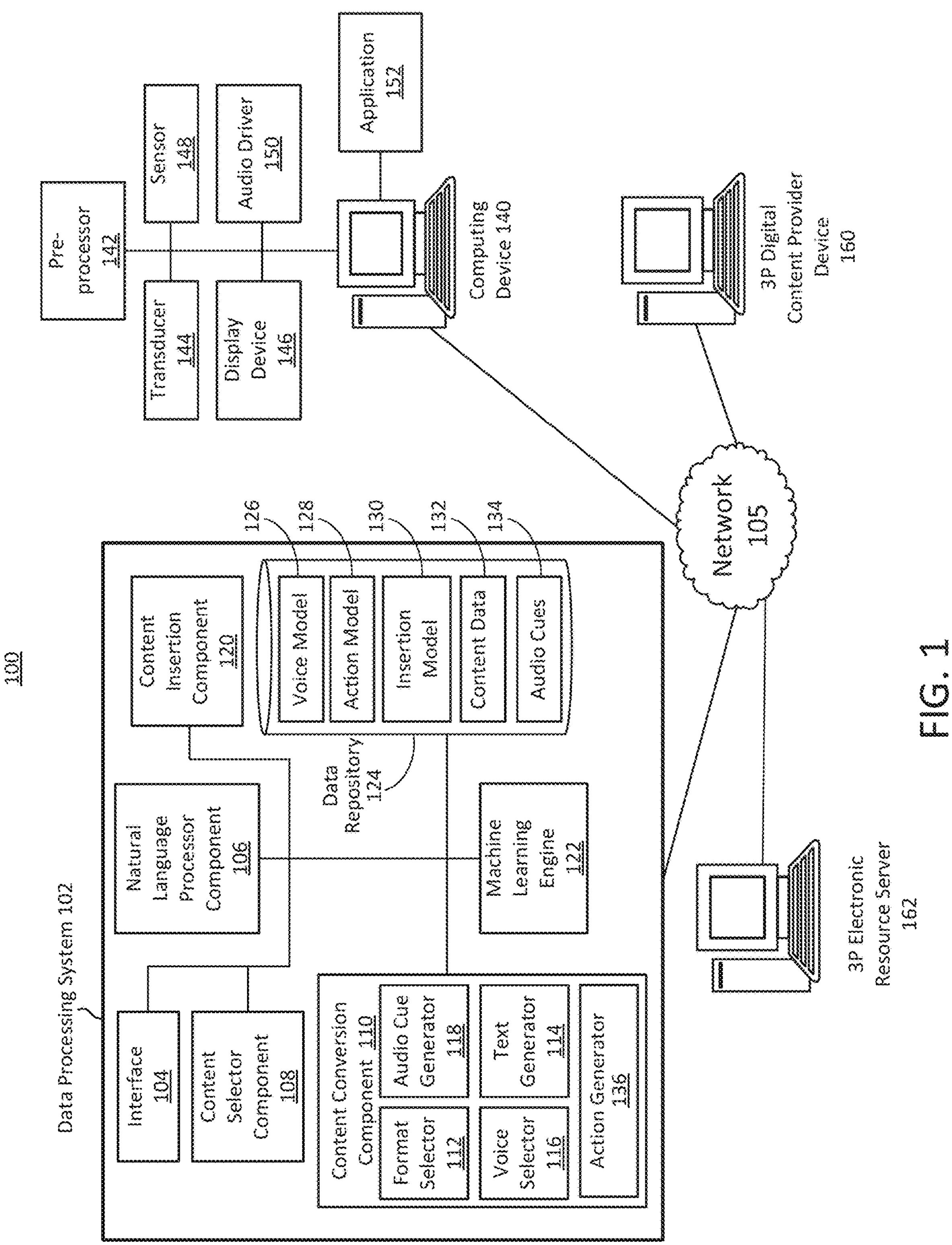
FIG. 1 is an illustration of a system to generate audio tracks, in accordance with an implementation.

Following below are more detailed descriptions of various concepts related to, and implementations of, methods, apparatus, and systems of generating audio tracks. For example, the methods, apparatus, and systems can generate an audio track from visual content. The various concepts introduced above and discussed in greater detail below may be implemented in any of numerous ways.

This technical solution is generally directed to generating audio tracks. The systems and methods of the technical solution can process visual content to generate an audio track with spoke and non-spoken audio cues. For example, certain types of computing devices may provide an audio-only interface (e.g., receive voice input from a user, process the input, and provide audio or spoken output via a digital voice). Certain computing devices may primarily use an audio user interface, or may primarily use an audio interface under certain circumstances. For example, a user of a mobile computing device may primarily use an audio-only interface while driving a vehicle, running, or listening to a streaming music service. When the primary interface is audio-based, a data processing system can provide audio digital component objects (e.g., audio content items). For example, the data processing system can select an audio content item established or provided by a third-party audio content provider. The data processing system can provide the audio content items in response to a request for content from the user or based on another trigger event. However, content items established by the third-party content provider may not be audio content items. The data processing system may determine to select such a content item based on matching criteria such as keywords, relevancy or other factors. However, the data processing system may be unable to provide the content item to the computing device because the computing device only has an audio-based interface. Or, in some cases, if the computing device primarily utilizes an audio interface, or the audio interface is the most efficient interface, then the data processing system can cause inefficient or wasted computing utilization or a negative user experience by providing the visual content item and causing the computing device to render the visual content item using a display of the computing device. Using the display may waste battery power on a mobile computing device (e.g., smartphone, smart watch, or other wearable device). Thus, the data processing system, by providing visual content where audio content is preferred, or being unable to provide the most relevant content item because it is only available in a visual format, may result in wasted computing resource utilization by a mobile computing device or degraded user experience.

Further, it can be technically challenging to generate a content item in a different format due to various technical problems including, for example, determining the format in which to generate the content item, how to generate the spoken text accurately for a visual content item that may or may not include any text, selecting an appropriate voice for the generated spoken text, and adding non-spoken audio cues. Systems and methods of the present technical solution can use natural language processing and models trained using machine learning techniques and historical data to select a format (e.g., audio only, audio-visual format, and modes of interaction based on type of computing device and current context of computing device), automatically generate text based on visual content item and associated metadata, select an appropriate digital voice print for generated spoken text, and select and provide non-spoken audio cues along with the spoken text.

For example, a computing device can be configured with both a visual user interface (e.g., a display screen with a touch screen for user input) and an audio-based user interface (e.g., microphone and speaker). The computing device can currently be streaming music for output via a speaker associated with the computing device. The data processing system can select a third-party content item using information associated with a request, a query, or the streaming music. The selected third-party content item can be a visual content item (e.g., an image that can include text). The data processing system can select this visual content item based on keywords associated with the request, query, or streaming music. For example, the selected visual content item can be a highest ranking content item determined based on a real-time content selection process in which content items can be ranked based at least on a relevancy score. The data processing system can determine that the computing device is configured with a visual user interface (e.g., display screen and touch screen input), and an audio user interface (e.g., speaker for output and microphone for input). However, the data processing system can further determine based on the current functionality of the computing device that the interface that is primarily being used currently is an audio-based interface. Thus, the data processing system can determine that although the computing device is configured with both visual and audio interfaces, that the primary interface currently being used is the audio interface and that generating an audio content item based on the visual content item to provide for rendering by the content item would reduce battery consumption by the computing device or wasted computing resources (e.g., provide the audio content item along with the streaming music instead of waking up a display of the computing device) and improve the user experience provided by the computing device (e.g., provide the audio content item in a non-distracting manner). This technical solution, therefore, can seamlessly transition content items between different modalities to reduce battery or computing resource utilization, while improving user interface functionality and user experience.

Upon creating an audio content item, the data processing system can determine an insertion time in the audio music stream. The data processing system can further dynamically determine whether to accompany the audio content item with any visual indicator, and what types of interactivity to configure for the content item.

FIG. 1 illustrates an example system 100 that generates audio tracks. The system 100 can generate audio tracks from visual content. The system 100 can include content selection infrastructure. The system 100 can include a data processing system 102. The data processing system 102 can include or execute on one or more processors (e.g., processor 310 depicted in FIG. 3). The data processing system 102 can communicate with one or more of a 3P digital content provider device 160 or computing device 140 (e.g., a client device) via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 140, such as a laptop, desktop, tablet, personal digital assistant, smart phone, portable computers, or speaker. For example, via the network 105 a user of the computing device 140 can access information or data provided by a 3P digital content provider device 160. The computing device 140 can include a display device 146 and a speaker (e.g., transducer driven by an audio driver 150). The computing device 140 may or may not include a display; for example, the computing device may include limited types of user interfaces, such as a microphone and speaker (e.g., a smart speaker). In some cases, the primary user interface of the computing device 140 may be a microphone and speaker. The computing device 140 can interface with or be included in a voice-based computing environment.

The network 105 can be used by the data processing system 102 to access information resources such as applications, web pages, web sites, domain names, or uniform resource locators that can be presented, output, rendered, or displayed by the client computing device 140. For example, via the network 105 a user of the client computing device 140 can access information or data provided by the 3P digital content provider device 160. The network 105 can include or constitute a sub-network of information resources available on the internet that are associated with a content placement or search engine results system, or that are eligible to include third party digital components as part of a digital component placement campaign.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The data processing system 102 can include at least one logic device such as a computing device having a processor to communicate via the network 105. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The data processing system 102 can include at least interface 104 that can receive and transmit data packets or information via network 105, or between various components of the data processing system 102. The data processing system 102 can include at least one natural language processor component 106 that can receive voice or audio input and process or parse the input audio signal. The data processing system 102 can include at least one content selector component 108 designed, constructed and operational to select digital component items (e.g., content items) provided by one or more 3P digital content provider devices 160. The data processing system 102 can include at least content conversion component 108 to determine whether to convert a content item in a first modality or format into a different modality or format. Converting a content item can refer to or include generating a new content item in a different format (e.g., generating an audio track from a visual content item, or generating an audio-visual content item from a visual-only content item). The new content item may or may not include portions of the original content item. The content conversion component 110 can include a format selector 112, a text generator 114, a voice selector 116, an action generator 136 or an audio cue generator 118. The data processing system 102 can include at least one content insertion component 120 that can determine when or where to insert a content item. The data processing system 102 can include at least one machine learning engine 122. The data processing system 102 can include at least one data repository 124. The data repository 124 can include or store one or more data structures, data files, databases, or other data. The data repository 124 can include one or more local or distributed databases, and can include a database management system. The data repository 124 can include computer data storage or memory.

The data repository 124 can include, store or maintain a voice model 126, an action model 128, an insertion model 130, content data 132, or audio cues 134. The voice model 126 can include a model trained using the machine learning engine 122 based on historical content items that include audio or audio-visual content, and metadata associated with the historical content items. The voice model 126 can also be trained using performance information associated with the historical content items.

The action model 128 can include a model trained using the machine learning engine 122 that can determine, for a content item, a type of action or interaction. For example, a user can interact with a content item by asking for more information about the content item, making a purchase, selecting a hyperlink, pausing, forwarding, rewinding, or skipping the content item, or perform some other action. The data processing system 102 can use the action model 128 to determine or predict a likely interaction with the content item, and then configure the content item for the predicted interaction. The action model 128 can also include categories of content items that map to predetermined actions.

The insertion model 130 can be trained using the machine learning engine 122 to determine where to insert the generated content item, such as where in a digital music stream. The insertion model 130 can be trained using historical data such as where different types of content items were inserted in digital music streams.

The content data 132 can include data about content items or digital component objects provided by 3P digital content provider devices 160. The content data 132 can include, for example, visual content items or indications of visual content items, content campaign parameters, keywords, or other data that facilitates content selection or content delivery.

The audio cues 134 can refer to non-spoken audio cues that can be added to a baseline audio track. The audio cues 134 can include audio files and metadata describing the audio file. Example audio cues can be ocean weaves, birds chirping, audience at a sporting event cheering, wind blowing, or car engine sounds.

The interface 104, natural language processor component 106, content selector component 108, content conversion component 110, format selector component 112, text generator component 114, voice selector component 116, action generator 136, audio cue generator 118, content insertion component 120, machine learning engine 122 or other component of the data processing system 102 can each include or utilize at least one processing unit or other logic device such as programmable logic array engine, or module configured to communicate with one another or other resources or databases. The interface 104, natural language processor component 106, content selector component 108, content conversion component 110, format selector component 112, text generator component 114, voice selector component 116, audio cue generator 118, content insertion component 120, machine learning engine 122 or other components of the data processing system 102 can be separate components, a single component, or part of the data processing system 102. The system 100 and its components, such as the data processing system 102, can include hardware elements, such as one or more processors, logic devices, or circuits. Components, systems or modules of the data processing system 102 can be executed at least partially by the data processing system 102.

The computing device 140 can include, interface, or otherwise communicate with at least one sensor 148, transducer 144, audio driver 150, pre-processor 142, or display device 146. The sensor 148 can include, for example, an ambient light sensor, proximity sensor, temperature sensor, accelerometer, gyroscope, motion detector, GPS sensor, location sensor, microphone, or touch sensor. The transducer 144 can include a speaker or a microphone. The audio driver 150 can provide a software interface to the hardware transducer 144. The audio driver can execute the audio file or other instructions provided by the data processing system 102 to control the transducer 144 to generate a corresponding acoustic wave or sound wave. The display device 146 can include one or more component or functionality of display 335 depicted in FIG. 3. The pre-processor 142 can be configured to detect a trigger keyword, predetermined hot word, initiation keyword, or activation keyword. In some cases, the trigger keyword can include a request to perform an action (such as an action selected by the action generator 136 using the action model 128). In some cases, the trigger keyword can include predetermined action keyword to enable or activate the computing device 140, and the request keywords can follow the trigger keyword or hot word. The pre-processor 142 can be configured to detect a keyword and perform an action based on the keyword. The pre-processor 142 can detect a wake-up word or other keyword or hotword, and responsive to the detection, invoke the natural language processor component 106 of the data processing system 102 executed by computing device 140. In some cases, the pre-processor 142 can filter out one or more terms or modify the terms prior to transmitting the terms to the data processing system 102 for further processing. The pre-processor 142 can convert the analog audio signals detected by the microphone into a digital audio signal, and transmit or provide one or more data packets carrying the digital audio signal to the data processing system 102 or the data processing system 102 via the network 105. In some cases, the pre-processor 142 can provide, to the natural language processor component 106 or the data processing system 102, data packets carrying some or all of the input audio signal, responsive to detecting an instruction to perform such transmission. The instruction can include, for example, a trigger keyword or other keyword or approval to transmit data packets comprising the input audio signal to the data processing system 102 or the data processing system 102.

The client computing device 140 can be associated with an end user that enters voice queries as audio input into the client computing device 140 (via the sensor 148) and receives audio output in the form of a computer generated voice that can be provided from the data processing system 102 (or the 3P digital content provider device 160) to the client computing device 140, output from the transducer 144 (e.g., a speaker). The computer generated voice can include recordings from a real person or computer generated language.

The computing device 140 can execute an application 152. The data processing system 102 can include or execute an operating system via which the computing device 140 can execute the application 152. The application 152 can include any type of application the client computing device 140 is configured to execute, run, launch, or otherwise provide. The application 152 can include a multimedia application, music player, video player, web browser, word processor, mobile application, desktop application, tablet application, electronic game, an electronic commerce application, or other type of application. The application 152 can execute, render, load, parse, process, present or otherwise output data corresponding to an electronic resource. An electronic resource can include, for example, a web site, web page, multimedia web content, video content, audio content, digital streaming content, travel content, entertainment content, content related to shopping for goods or services, or other content.

The application 152 executing on the computing device 140 can receive data associated with the electronic resource from a third-party ("3P") electronic resource server 162. The 3P electronic resource server 162 can provide the electronic resource for execution by the application. The 3P electronic resource server 162 can include a file server, web server, gaming server, multimedia server, cloud computing environment, or other backend computing system configured to provide data to cause the application to present or provide the electronic resource via the computing device 140. The computing device 140 can access the 3P electronic resource server 162 via network 105.

An administrator of the 3P electronic resource server 162 can develop, establish, maintain or provide the electronic resource. The 3P electronic resource server 162 can transmit the electronic resource to the computing device 140 responsive to a request for the electronic resource. The electronic resource can be associated with an identifier, such as a uniform resource locator ("URL"), uniform resource identifier, web address, or filename, or file path. The 3P electronic resource server 162 can receive the request for the electronic resource from the application 152. The electronic resource can include an electronic document, webpage, multimedia content, streaming content (e.g., music, news, or podcasts), audio, video, text, images, video game, or other digital or electronic content.

The data processing system 102 can access, or otherwise interact with at least one 3P digital content provider device 160. The 3P digital content provider device 160 can include at least one logic device such as a computing device having a processor to communicate via the network 105, for example with the computing device 140, the data processing system 102, or the data processing system 102. The 3P digital content provider device 160 can include at least one computation resource, server, processor or memory. For example, the 3P digital content provider device 160 can include a plurality of computation resources or servers located in at least one data center. The 3P digital content provider device 160 can include or refer to an advertiser device, a service provider device, or goods provider device.

The 3P digital content provider device 160 can provide digital components for presentation by the computing device 140. The digital components can be visual digital components for presentation via a display device 146 of the computing device 140. The digital component can include responses to search queries or requests. The digital component can include information from databases, search engines, or networked resources. For example, the digital component can include news information, weather information, sports information, encyclopedia entries, dictionary entries, or information from digital textbooks. The digital components can include advertisements. The digital component can include offers for a good or service, such as a message that states: "Would you like to purchase sneakers?" The 3P digital content provider device 160 can include memory to store a series of digital components that can be provided in response to a query. The 3P digital content provider device 160 can also provide visual or audio based digital components (or other digital components) to the data processing system 102 where they can be stored for selection by the content selector component 108. The data processing system 102 can select the digital components and provide (or instruct the content provider computing device 160 to provide) the digital components to the client computing device 140. The digital components can be exclusively visual, exclusively audio, or a combination of audio and visual data with text, image, or video data. The digital components or content items can include images, text, video, multimedia, or other types of content in one or more formats.

The data processing system 102 can include a content placement system having at least one computation resource or server. The data processing system 102 can include, interface, or otherwise communicate with at least one content selector component 108. The data processing system 102 can include, interface, or otherwise communicate with at least one digital assistant server.

The data processing system 102 can obtain anonymous computer network activity information associated with a plurality of computing devices 140. A user of a computing device 140 can affirmatively authorize the data processing system 102 to obtain network activity information corresponding to the user's computing device 140. For example, the data processing system 102 can prompt the user of the computing device 140 for consent to obtain one or more types of network activity information. The identity of the user of the computing device 140 can remain anonymous and the computing device 140 can be associated with a unique identifier (e.g., a unique identifier for the user or the computing device provided by the data processing system or a user of the computing device). The data processing system 102 can associate each observation with a corresponding unique identifier.

A 3P digital content provider device 160 can establish an electronic content campaign. The electronic content campaign can be stored as content data in a data repository of the content selector component 108. An electronic content campaign can refer to one or more content groups that correspond to a common theme. A content campaign can include a hierarchical data structure that includes content groups, digital component data objects, and content selection criteria. To create a content campaign, 3P digital content provider device 160 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or 3P digital content provider device 160), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 140. In some cases, an impression can refer to a viewable or audible impression; e.g., the digital component object is at least partially (e.g., 20%, 30%, 30%, 40%, 50%, 60%, 70%, or more) viewable on a display device of the client computing device 140, or audible via a speaker of the computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The 3P digital content provider device 160 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the 3P digital content provider device 160 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the 3P digital content provider device 160 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The 3P digital content provider device 160 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The 3P digital content provider device 160 can provide one or more keywords to be used by the data processing system 102 to select a digital component object provided by the 3P digital content provider device 160. The 3P digital content provider device 160 can identify one or more keywords to bid on, and further provide bid amounts for various keywords. The 3P digital content provider device 160 can provide additional content selection criteria to be used by the data processing system 102 to select digital component objects. Multiple 3P digital content provider devices 160 can bid on the same or different keywords, and the data processing system 102 can run a content selection process or ad auction responsive to receiving an indication of a keyword of an electronic message.

The 3P digital content provider device 160 can provide one or more digital component objects for selection by the data processing system 102. The data processing system 102 (e.g., via content selector component 108) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. Upon selecting a digital component, the data processing system 102 can transmit the digital component object for presentation via the computing device 140, rendering on a computing device 140 or display device of the computing device 140. Rendering can include displaying the digital component on a display device, or playing the digital component via a speaker of the computing device 140. The data processing system 102 can provide instructions to a computing device 140 to render the digital component object. The data processing system 102 can instruct the natural language processor component 106 of the computing device 140, or an audio driver 150 of the computing device 140, to generate audio signals or acoustic waves. The data processing system 102 can instruct an application executed by the computing device 140 to present the selected digital component object. For example, the application (e.g., a digital music streaming application) can include a slot (e.g., a content slot) in which the digital component object can be presented (e.g., audio slot or visual slot).

The data processing system 102 can include at least one interface 104. The data processing system 102 can include an interface 104 designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can facilitate communications between one or more component of the system 100, such as between the natural language processor component 106, the content selector component 108, the content conversion component 110 and the data repository 124.

The interface 104 can receive, via network 105, data packets that include an input audio signal detected by a microphone (e.g., sensor 148) of a computing device 140 remote from the data processing system 102. A user of the computing device 140 can provide speech or voice input to the computing device 140 and instruct or otherwise cause the computing device 140 to transmit the input audio signal, or data packets generated based on the audio signal by the pre-processor 142, to the data processing system 102.

The data processing system 102 can include, interface or otherwise communicate with a natural language processor component 106 designed, constructed and operational to parse the data packets or input audio signal. The natural language processor component 106 can include hardware, electronic circuitry, an application, script or program at the data processing system 102. The natural language processor component 106 can receive input signals, data packets or other information. The natural language processor component 106 can include or be referred to as a speech recognizer configured to process input audio signals containing speech to transcribe the speech to text, and then perform natural language processing to understand the transcribed text. The natural language processor component 106 can receive data packets or other input via interface 104. The natural language processor component 106 can include an application to receive input audio signals from the interface 104 of the data processing system 102, and to drive components of the client computing device to render output audio signals. The data processing system 102 can receive data packets or other signals that include or identify an audio input signal. For example, the natural language processor component 106 can be configured with NLP techniques, functionality or components that can receive or obtain the audio signal and parse the audio signal. The natural language processor component 106 can provide for interactions between a human and a computer. The natural language processor component 106 can be configured with techniques for understanding natural language and allowing the data processing system 102 to derive meaning from human or natural language input. The natural language processor component 106 can include or be configured with technique based on machine learning, such as statistical machine learning. The natural language processor component 106 can utilize decision trees, statistical models, or probabilistic models to parse the input audio signal. The natural language processor component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The natural language processor component 106 can (e.g., utilizing an NLP technique, functionality or component) convert the audio input signal into recognized text using a machine learning model training based on training data containing. The set of audio waveforms can be stored in data repository 124 or other database accessible to the data processing system 102. The representative waveforms can be generated across a large set of users, and then may be augmented with speech samples from the user. After the audio signal is converted into recognized text, the natural language processor component 106 can match the text to words that are associated, for example by using a model stored in data repository 124 that has been trained across users or through manual specification, with actions that the data processing system 102 can serve.

The audio input signal can be detected by the sensor 148 or transducer 144 (e.g., a microphone) of the client computing device 140. Via the transducer 144, the audio driver 150, or other components the client computing device 140 can provide the audio input signal to the data processing system 102, where it can be received (e.g., by the interface 104) and provided to the NLP component 106 or stored in the data repository 124.

The natural language processor component 106 can obtain the input audio signal. From the input audio signal, the natural language processor component 106 can identify at least one request or at least one trigger keyword, keyword, or request. The request can indicate intent or subject matter of the input audio signal. The keyword can indicate a type of action likely to be taken. For example, the natural language processor component 106 can parse the input audio signal to identify at least one request to invoke an application, interact with a content item, or request for content. The natural language processor component 106 can parse the input audio signal to identify at least one request, such as a request to leave home for the evening to attend dinner and a movie. The keyword can include at least one word, phrase, root or partial word, or derivative indicating an action to be taken. For example, the keyword "go" or "to go to" from the input audio signal can indicate a need for transport. In this example, the input audio signal (or the identified request) does not directly express an intent for transport, however the keyword indicates that transport is an ancillary action to at least one other action that is indicated by the request.

The natural language processor component 106 can parse the input audio signal to identify, determine, retrieve, or otherwise obtain the request and the keyword. For instance, the natural language processor component 106 can apply a semantic processing technique to the input audio signal to identify the keyword or the request. The natural language processor component 106 can apply the semantic processing technique to the input audio signal to identify one or more keywords. A keyword can include one or more terms or a phrase. The natural language processor component 106 can apply the semantic processing technique to identify an intent to perform a digital action.

For example, the computing device 140 can receive an input audio signal detected by a sensor 148 (e.g., microphone) of the client computing device 140. The input audio signal can be "Digital assistant, I need someone to do my laundry and my dry cleaning." A pre-processor 142 of the client computing device 140 can detect a wakeup word, hot word, or trigger keyword in the input audio signal, such as "Digital assistant". The pre-processor 142 can detect the wakeup word, hot word, or trigger keyword by comparing an audio signature or waveform in the input audio signal with a model audio signature or waveform that corresponds to the trigger keyword. The pre-processor 142 can determine that the input audio signal includes a wakeup word, hot word, or trigger keyword that indicates that the input audio signal is to be processed by the natural language processor component 106. Responsive to detecting hot word, wakeup word, or trigger keyword, the pre-processor 142 can determine, authorize, route, forward, or other provide the detected input audio signal to the data processing system 102 for processing by the natural language processor component 106.

The natural language processor component 106 can receive the input audio signal and apply a semantic processing technique, or other natural language processing technique, to the input audio signal comprising the sentence to identify trigger phrases "do my laundry" and "do my dry cleaning". In some cases, the natural language processor component 106 can provide data packets corresponding to the input audio signal to the data processing system 102 to cause the natural language processor component 106 to process the input audio signal. The natural language processor component 106 can process the input audio signal in conjunction with or via the digital assistant server. The natural language processor component 106 can further identify multiple keywords, such as laundry, and dry cleaning.

The natural language processor component 106 can identify search queries, keywords, intents or phrases corresponding to performing a search or other request for information. The natural language processor component 106 can determine that the input audio signal corresponds to a request for information about a topic, event, current event, news event, dictionary definition, historical event, person, place or thing. For example, the natural language processor component 106 can determine that the input audio signal corresponds to a query, request, intent, or action to make travel arrangements, book a ride, obtain information, perform a web search, check stock prices, launch an application, check the news, order food, or shop for other products, goods or services.

The natural language processor component 106 can use one or more techniques to parse or process the input audio signal. Techniques can include rule-based techniques or statistical techniques. Techniques can utilize machine learning or deep learning. Example techniques can include named entity recognition, sentiment analysis, text summarization, aspect mining, or topic mining. Techniques can include or be based on text embeddings (e.g., real values vector representations of strings), machine translation (e.g., language analysis and language generation), or dialogue and conversations (e.g., models used by artificial intelligence). Techniques can include determine or leverage syntax techniques (e.g., arrangement of words in a sentence based on grammar) such as lemmatization, morphological segmentation, word segmentation, part-of-speech tagging, parsing, sentence breaking, or stemming. Techniques can include determine or leverage semantics techniques such as named entity recognition (e.g., determining the parts of the text that can be identified and categorized into present groups such as names of application 152, people or places), word sense disambiguation, or natural language generation.

In some cases, the natural language processor component 106 can identify a request to launch the application 152, and provide instructions to the computing device 140 to launch the application 152. In some cases the application 152 may already be launched prior to the natural language processor component 106 receiving the input audio signal. For example, based on processing or parsing the input audio signal, the natural language processor component 106 can identify an application 152 to invoke, launch, open, or otherwise activate. The natural language processor component 106 can identify the application 152 based on parsing the input audio signal to identify the terms, keywords, trigger keywords or phrases. The natural language processor component 106 can perform a lookup in the data repository 124 using the identified terms, keywords, trigger keywords or phrases to identify the application 152. In some cases, the keyword can include an identifier of the application 152, such as "Application_Name_A" or "Application_Name_B". In some cases, the keyword can indicate a type or category of application 152, such as ride sharing application, restaurant booking application, movie ticket application, news application, weather application, navigation application, streaming music application, streaming video application, restaurant review application, or other type or category of application 152. For cases in which the application 152 may already be launched and executing prior to receipt of the input audio signal, the natural language processor component 106 can process the input audio signal to determine an action to perform in the application 152 or responsive to a call-to-action presented via the electronic resource rendered by the application 152.

The data processing system 102 can receive, via a computer network, a request for content for presentation on a computing device 140. The data processing system 102 can identify the request by processing an input audio signal detected by a microphone of the client computing device 140. The request can include selection criteria of the request, such as the device type, location, and a keyword associated with the request. The selection criteria can include information about a context of the computing device 140. The context of the computing device 140 can include information about an application that is being executed on the computing device 140, information about a location of the computing device 140, information about content being rendered, presented, provided, or accessed via the computing device 140 (e.g., via application 152). For example, the content selection criteria can include information or keywords such as an artist, song title, or genre associated with music being played via a digital streaming music application 152. In some cases, the content selection criteria can included keywords associated with browsing history of the application 152.

The data processing system 102 can determine to select a digital component provided by a 3P digital content provider device 160. The data processing system 102 can determine to select the digital component responsive to a request from the computing device 140. The data processing system 102 can determine to select the digital component responsive to identifying a content slot in the application 152. The data processing system 102 can determine to select a digital component responsive to an event, condition, trigger, or based on time interval.

The data processing system 102 can select a digital component object from a data repository 124 or a database that can include content provided by one or more 3P digital content provider devices 160, and provide the digital component for presentation via the computing device 140 via network 105. The computing device 140 can interact with the digital component object. The computing device 140 can receive an audio response to the digital component. The computing device 140 can receive an indication to select a hyperlink or other button associated with the digital component object that causes or allows the computing device 140 to identify a goods or service provider, request a good or service from the goods or service provider, instruct the service provider to perform a service, transmit information to the service provider, or otherwise query the goods or service provider device.

The data processing system 102 can include, execute, or otherwise communicate with a content selector component 108 to receive the request, queries, keywords or content selection criteria and select, based on the received information, a digital component. The data processing system 102 can select the digital component object based on content selection criteria input into a real-time content selection process. The data processing system 102 can select the digital component object from a data repository 124 storing multiple digital component objects provided by multiple third-party content providers 160.

The data processing system 102 can store information used to select digital component objects in a content data 132 data structure or database in the data repository 124. Content data 132 can include content selection criteria, digital component objects, historical performance information, preferences, or other information used to select and deliver digital component objects.

The content selector component 108 can select the digital component via a real-time content selection process. The content selection process can include, for example, performing a search via a search engine, or accessing a database stored on a remote server or device such as a 3P digital content provider device 160. The content selection process can refer to, or include, selecting sponsored digital component objects provided by third party content providers 160. The real-time content selection process can include a service in which digital components provided by multiple content providers are parsed, processed, weighted, or matched in order to select one or more digital components to provide to the computing device 140. The content selector component 108 can perform the content selection process in real-time. Performing the content selection process in real-time can refer to performing the content selection process responsive to the request for content received via the client computing device 140. The real-time content selection process can be performed (e.g., initiated or completed) within a time interval of receiving the request (e.g., 1 second, 2 seconds, 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 140, or within a time interval after the communication session is terminated. The real-time content selection process can refer to or include an online content item auction.

To select digital components for presentation in a voice-based environment, the data processing system 102 (e.g., via an NLP component of the natural language processor component 106) can parse the input audio signal to identify queries, keywords, and use the keywords and other content selection criteria to select a matching digital component. The content selector component 108 can select the digital component object based on keywords associated with content rendered by the application 152 executing on the computing device 140 device prior to the request. The data processing system 102 can select the matching digital component based on a broad match, exact match, or phrase match. For example, the content selector component 108 can analyze, parse, or otherwise process subject matter of candidate digital components to determine whether the subject matter of the candidate digital components correspond to the subject matter of the keywords or phrases of the input audio signal detected by the microphone of the client computing device 140. The content selector component 108 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the content selector component 108 may process the metadata to determine whether the subject matter of the candidate digital component corresponds to the input audio signal.

3P digital content providers 160 may provide additional indicators when setting up a content campaign that includes digital components. The content provider may provide information at the content campaign or content group level that the content selector component 108 may identify by performing a lookup using information about the candidate digital component. For example, the candidate digital component may include a unique identifier, which may map to a content group, content campaign, or content provider. The content selector component 108 may determine, based on information stored in content campaign data structure in data repository 124, information about the 3P digital content provider device 160.

The format or modality of the digital component object selected by the content selector component 108 can be visual, audio-visual, or audio-only. A digital component object having a visual-only format can be an image or image with text. A digital component object having an audio-only format can be an audio track. A digital component object having an audio-visual format can be a video clip. Digital component objects can be configured for different types of interaction based on the format of the digital component object. For example, a visual-only digital component object can be configured for interaction via keyboard, mouse or touch screen input (e.g., to select a hyperlink embedded in the digital component object). An audio-only digital component object can be configured for interaction via voice input (e.g., configured to detect a predetermined keyword to perform an action).

However, the format of the digital component object selected by the content selector component 108 may not be compatible with the computing device 140 or may not be optimized for presentation by the computing device 140. In some cases, the data processing system 102 can filter for digital component objects that are compatible or optimized for the computing device 140. Filtering based on format or modality can result in selecting a digital component object having a format that is be compatible or optimized for the computing device 140. Filtering based on format or modality may prevent the selection of digital component objects that may be relevant or a better match with the content selection criteria because the format of the digital component objects may not be compatible or optimized for the computing device 140. For example, if the computing device 140 is a smart speaker that lacks a display device 146, then visual content items may be filtered out or prevented from selection, limiting the selections to audio-only content items. In the event visual content items contained keywords that were a better match with the content selection criteria than the selected audio-only content item, the data processing system 102 may be unable to provide the top matching content item. By not providing the top matching content item, the data processing system 102 may be wasting computing resource consumption, network bandwidth, or battery power of the computing device 140 by providing an irrelevant content item for presentation.

Thus, this technical solution can select the best matching digital component object based on content selection criteria and regardless of format, and then convert the digital component object into a format that is optimized or compatible with the computing device 140. By not removing or preventing content items from being selected due to format or modality, this technical solution can select a highest ranking content item based on relevancy and other content selection criteria, and then convert, in real-time, the content item to the desired format.

To do so, the data processing system 102 can include a content conversion component 110 designed, constructed and operational to generate a digital component object in a format that is different from the original format of the digital component object provided by the 3P digital content provider device 160. The 3P digital content provider device 160 can provide an original content item in a first format, and the data processing system 102 can generate a second content item in a second format that is based on the original content item. For example, the content selector component 108 can select, based on the request or content selection criteria, a digital component object having a visual output format. The content conversion component 110 can determine that the computing device 140 lacks a display device, but has an audio interface. The content conversion component 110 can then generate a new digital component object having an audio-only format. The content conversion component 110 can use metadata associated with the digital component object to generate the new digital component object with the audio-only format. The content conversion component 110 can select a format for the new content item, generate text based on the original content item, select a voice for the new content item, generate non-spoken audio cues for the new content item, generate actions used to interact with the new content item, and then generate the new content item to provide to the computing device 140.

The content conversion component 110 can include a format selector 112 designed, constructed and operational to select a format with which to generate a digital component object based on the digital component object selected by the content selector component 108. The format selector 112 can use various techniques or factors to determine a format into which to convert the digital component object. Factors can include, for example, a type of computing device 140, available interfaces of the computing device 140, remaining battery power of the computing device 140, location of the computing device 140, a mode of transportation (e.g., driving, train, airplane, walking, running, biking, or stationary) associated with the computing device 140, a type of application 152 executing in the foreground on the computing device 140, a state of the computing device 140, or other factors. In some cases, factors can include user activity such as cooking, working, or relaxing. The data processing system 102 can determine a user is cooking based on the time of day or recent search activity (e.g., looking for a recipe). The data processing system 102 can determine whether a user is working based on time of day, day of week, and location (e.g., place of business). The data processing system 102 can determine whether the user is relaxing based on time of day, location, and activity on the computing device 140 (e.g., streaming a movie).

The format selector 112 can select the format to which to convert the selected digital component object based on a type of computing device 140. The format selector 112 can receive information about the type of the computing device 140 along with the request for content. For example, the request for content provided by the computing device 140 can indicate a type of the computing device 140. In cases in which a request for content is not received, the format selector 112 can determine the type of the computing device 140 based on account information or profile information associated with the computing device 140, or information received from the application 152 executing on the computing device 140. In some cases, the format selector 112 can query the computing device 140 for information about the type of the computing device 140. Example types of computing devices 140 can include laptop, tablet, smart watch, wearable device, smartphone, smart speaker, smart television, or an internet-of-things device (e.g., a smart appliance or smart light). The type of device can indicate types of interfaces (e.g., visual output interface, audio output interface, audio input interface, touch input interface, or keyboard and mouse interface) available on the computing device 140. For example, if the type of computing device 140 is a smart speaker, then the data processing system 102 can determine that the primary interface for the computing device 140 is an audio interface, and that the computing device 140 lacks a display device. The format selector 112 can determine, responsive to the primary interface for the type of device being an audio-only interface, to convert the original visual digital component object into an audio-only format digital component object. In another example, if the type of computing device is a smart television, then the data processing system 102 can determine that the primary interface is an audio-visual interface. The format selector 112, responsive to determining that the primary interface is an audio visual interface, can determine to convert the original visual-only digital component object into an audio-visual digital component object. By converting the digital component object into the primary format for the type of computing device 140, the data processing system 102 can optimize rendering or presentation of the digital component object on the computing device 140. Optimizing the rendering or presentation can refer to outputting the digital component object using the primary user interface or primary combination of user interfaces of the computing device 140.

The format selector 112 can select the format for the conversion based on the available interfaces of the computing device 140. The type of computing device 140 can indicate the types of interfaces the computing device 140 includes. However, one or more of the interfaces may be unavailable, in which case, the format selector 112 can identify an available interface and then convert the digital component object into the format corresponding to the available interface. For example, a computing device 140 can output audio such as streaming digital music while disabling or turning off a display device 146, which can reduce power consumption. In this example, the format selector 112 can determine that the visual interface is currently unavailable because the display device 146 has been turned off, but can determine that the audio output interface is available because it is currently outputting audio. In another example, the format selector 112 can determine that the audio interface is unavailable if the audio has been muted, and determine that the visual output interface available if the display device 146 is actively providing visual output. Thus, if the audio interface is unavailable, the format selector 112 can select a visual output format for the digital component object; if the visual interface is unavailable, the format selector 112 can select an audio output format for the digital component object. If neither the visual or audio output interfaces are available, the format selector 112 can terminate content conversion and block delivery of the digital component object so as to avoid wasted computing resource utilization and network bandwidth utilization.

The format selector 112 can determine the output interface based on the remaining battery power of the computing device 140. For example, if the remaining batter power is under a threshold (e.g., 10%, 15%, 20%, 25% or some other threshold), then the format selector 112 can determine to select a format that utilizes the least amount of energy to render, such as audio output which can consume less energy as compared to a display device.

The format selector 112 can select the format for the digital component object based on the mode of transportation of the computing device 140. Example modes of transportation can include driving, train, airplane, walking, running, biking, or stationary (e.g., not moving or no transportation). The format selector 112 can select an audio-only output format if the mode of transportation is driving, running, or biking so as to avoid distracting the user and avoid wasted energy consumption since a user may not be able to perceive visual output in those modes of transportation. If the mode of transportation is walking, stationary, public transportation, or airplane, then the format selector 112 can select a visual output or an audio-visual output format because a visual output may not distract the user and the user is likely able to perceive the visual output.

The format selector 112 can select the format for the digital component object based on a type of application 152 executing in the foreground on the computing device 140. If the primary output interface of the application 152 is audio-only, such as a digital music streaming application 152, then the format selector 112 can select an audio-output format, for example. If the primary output interface of the application 152 is a visual-only format, then the format selector 112 can select a visual-only output. If the primary output interface of the application 152 is a combination of audio-visual output, such as in a digital video streaming application 152, then the format selector 112 can select an audio-visual output format for the digital component object.

The format selector 112 can select the format for the digital component object based on the type of computing device 140 being a digital assistant device, or based on the computing device 140 executing an application 152 comprising a digital assistant application. A digital assistant application can refer to or include a virtual assistant. The digital assistant application can include a software agent that can perform tasks or services based on commands or questions. The digital assistant application 152 can be configured to receive and process natural language input (e.g., spoken by a user), and then perform tasks, actions or provide responsive to the input. The format selector 112 can determine, responsive to the type of application 152 or computing device 140 being a digital assistant, to select an audio-only format for the digital component object because a primary interface of the digital assistant application 152 can be a voice-based (or audio based) interface.

The content conversion component 110 can include a text generator 114 designed, constructed and operational to generate text based on the digital component object. For example, responsive to the format selector 112 determining to convert a visual digital component object into an audio-only digital component object, the text generator 114 can process the digital component object to generate text that can be output via audio. To generate the text based on the visual component object, the text generator 114 can parse text in the visual component, apply an image processing technique to process the visual digital component object, or apply an optical character recognition technique. The text generator 114 can obtain metadata associated with the visual component object and parse or process the metadata to generate the text. The metadata can include, for example, product specifications or a product description. Thus, the text generator 114 can use, for example, tuples of text in the visual digital component, a hyperlink or uniform resource locator embedded in the digital component object, a link to a product, or the product description.

The text generator 114 can input the tuples of text obtained from the visual digital component, metadata or corresponding links into a natural language generation model to generate text. The text generator 114 can include, be configured with, or access a natural language generation engine or component. Natural language generation can refer to a process that transforms structured data into natural language. The text generator 114, using natural language generation, can generate text that can be read out by a text-to-speech system.

The text generator 114, configured with a natural language generation technique, can generate the text in multiple stages, such as: content determination (e.g., deciding what information to mention in the text); document structuring (e.g., overall organization of the information to convey); aggregation (e.g., merging of similar sentences to improve readability and naturalness); lexical choice (e.g., putting words to the concepts); referring expression generation (e.g., creating referring expressions that identify objects and regions); and realization (e.g., creating the actual text, which can be correct according to the rules of syntax, morphology, and orthography).

The text generator 114 can perform natural language generation by training a statistical model using machine learning, such as on a large corpus of human-written texts. The machine learning can process human-written text corresponding to digital component objects provided by 3P digital content provider devices 160, for example, in order to train the model.

The text generator 114 can use a sequence-to-sequence model to generate the text. A sequence-to-sequence model can include two parts, an encoder and a decoder. The encoder and decoder can be two different neural network models combined into one network. The neural network can be a recurrent neural network ("RNN"), such as long short-term memory ("LSTM") blocks. The encoder portion of the network can be configured to understand the input sequence (e.g., tuples corresponding to text in the visual digital component, a hyperlink or uniform resource locator embedded in the digital component object, a link to a product, or the product description), and then create a smaller dimensional representation of the input. The encoder can forward this representation to a decoder network which can be configured to generate a sequence that represents the output. The decoder can generate words one by one in each time step of the decoder's iteration.

The text generator 114 can use a generative adversarial network ("GAN") to generate the text. A GAN can refer to a generator network that is trained to produce realistic samples by introducing an adversary (e.g., a discriminator network) that is configured to detect if a generated text is "real" or "fake". For example, the discriminator can be a dynamically-updated evaluation metric used to tune the generator. The generator and discriminator in a GAN can continuously improve until an equilibrium point is reached.

Thus, the text generator 114 can generate text based on a visual digital component object using a natural language generation technique. The content conversion component 110 can select a digital voice print to use to output the text as speech. The content conversion component 110 can include a voice selector 116 designed, constructed and operational to select a digital voice to render the text. The content conversion component 110 can select the digital voice based on the context of the digital component object or based on the generated text. The voice selector 116 can select a digital voice that matches the type of digital component object or context of the text. For example, the voice selector 116 can select a different digital voice for an advertisement for a pillow as compared to an advertisement for an action movie To select a digital voice print to generate an audio track for the text generated by the text generator 114, the voice selector 116 can use a voice model 126 trained by the machine learning engine 122 using historical data. The historical data used to train the voice model 126 can include, for example, audio digital component objects created by 3P digital content providers for presentation via a computing device 140 or other mediums. The historical data can include metadata or contextual information associated with each of the audio digital component objects created by 3P digital content providers. The metadata or contextual information can include, for example, topics, concepts, keywords, geographic locations, brand names, vertical category, product categories, service categories, or other information that describes aspects of the audio digital component object. The historical data can include performance information associated with the audio digital component object. The performance information can indicate whether an end user interacted with the audio digital component, such as a selection or conversion on the audio digital component object.

For example, the historical digital components can include radio advertisements (e.g., broadcast radio or digital streaming radio stations), television advertisements (e.g., broadcast or cable television, or digital streaming television channels) that were created by 3P content providers for broadcast on televisions, radios, or computing devices 140. These historical digital components can include audio and visual components if they are being presented on a television. The metadata or contextual information associated with the television advertisements can include a type of product (e.g., automobile, travel, consumer electronics, or food), type of service (e.g., tax services, phone service, internet service, restaurant, delivery service, or household services), descriptive information about the product or service, information about the company or entity providing the product or service, geographic location in which the advertisement is to be provided (e.g., state, geographic region, city, or zip code), or other keywords. Thus, the historical data can include the audio track corresponding to the audio (or audio-video) 3P digital component object as well as metadata associated with the audio track. An example data structure storing historical 3P digital component objects is illustrated in Table 1.

TABLE 1

Illustrative Example of Historical Data

| Unique ID | Audio File | Product/ Service | Vertical | Location | Brand | Description |
|---|---|---|---|---|---|---|
| 1 | Audio_1.mp3 | Product | Automotive | USA | Company_A | Luxury sports car |
| 2 | Audio_2.mp3 | Service | Banking | New England | Company_B | Low interest rate credit card offer |

Table 1 provides an illustrative example of historical data used by the machine learning engine 122 to train the voice model 126 used by the voice selector 116 to select a digital voice to use to render the text generated by text generator 114. As illustrated in Table 1, each historical 3P digital component object can include an audio track (e.g., Audio_1.mp3 and Audio_2.mp3), an indication of whether the advertisement is for a product or service, an indication of the vertical market (e.g., automotive or banking), an indication of the location in which the advertisement is provided (e.g., national USA, or geographic region such as New England), a brand or provider of the advertisement (e.g., Company_A or Company_B), and additional description or keywords associated with the digital component object (e.g., luxury sports car, or low interest rate credit card offer). The audio file can be in any format, including, for example, .wav, .mp3, .aac, or any other audio format. In some cases, the historical digital component objects can include both audio and video, in which case the audio file format can refer to an audio and visual file format such as .mp4, .mov, .wmv, .flv, or other file formats.

The data processing system 102 can pre-process the historical digital component data to put the data in a format suitable for the machine learning engine 122 to process the data to train the voice model 126. For example, the voice selector 116 or machine learning engine 122 can be configured with an audio processing technique or parsing technique to process the historical digital component data to identify features in the data. Features can include, for example, audio characteristics in the audio file, product/service, vertical category, keywords from the description, or other information. Example audio characteristics can include gender of the voice, age range of the voice, pitch, frequency, amplitude or volume, intonations, dialect, language, accent, rate at which words are spoken, or other characteristics.

The machine learning engine 122 can use any machine learning or statistical technique to analyze the historical data and train the voice model 126. The machine learning engine 122 can be configured with learning techniques or functions that can build a model based on sample data or training data (e.g., the historical digital component objects) in order to make predictions or decisions. The machine learning engine 122 can be configured with supervised or unsupervised learning techniques, semi-supervised learning, reinforcement learning, self-learning, feature learning, sparse dictionary learning, or association rules. To perform machine learning, the machine learning engine 122 can create the voice model 126 trained on training data. The model can be based on, for example, artificial neural networks, decision trees, support vector machines, regression analysis, Bayesian networks, or genetic algorithms.

The voice selector 116, upon receiving the text generated by the text generator 114 based on the visual digital component, can use the text along with the metadata associated with the visual digital component to select a digital voice print using the voice model 126 trained via the machine learning engine 122. For example, the data processing system 102 can select, via a voice model 126, the digital voice based on context of the digital component object. The context can include or refer to or include the text, the metadata or other information associated with the digital component object. The context can refer to or include information associated with the computing device 140. In some cases, the voice selector 116 can select the digital voice based on the context of the computing device 140, such as mode of transportation, location, preferences, performance information or other information associated with the computing device 140.

The voice selector 116 can input the context of the digital component object into a voice model 126 to generate a voice characteristics vector, and then select the digital voice to render the text. The text and metadata can indicate information about the product, service, vertical category, keywords, or other information that can be input into the voice model 126. The input to the voice model 126 can be the text generated based on the visual digital component, or a combination of the text and the metadata of the visual digital component. The output of the voice model 126 can be a voice characteristics vector that predicts characteristics of the digital voice print to use to render the text. The output can indicate a gender of the digital voice print (e.g., male or female), intonations (e.g., intonations can change for each syllable in the text), accent, phonation, pitch, loudness, speech rate, tone, texture, loudness, or other information. The output of the voice model 126 can include other voice types such as bass, baritone, tenor, alto, mezzo-soprano and soprano.

The voice selector 116 can compare the voice characteristics vector output by the voice model 126 with available digital voice prints stored in the data repository 124 to identify a matching digital voice print, or closest matching digital voice print. Digital voice prints can be categorized based on gender, accent, phonation, pitch, loudness, speech rate or other information. The voice selector 116 can compare the output of the voice model 126 with the stored or available digital voice prints to select a closest matching digital voice print to use to render the text. The voice selector 116 can weight the characteristics to select the matching voice print. For example, a characteristic such as gender can be weighted more heavily than a characteristic such as accent. A characteristic such as speech rate can be weighted more heavily than a characteristic such as accent. In some cases, the voice selector 116 can select the digital voice that matches the most characteristics. The voice selector 116 can use any matching technique to select the digital voice print based on the output of the voice model 126.

The selected digital voice print can include a unique identifier that identifies the digital voice print. The digital voice print can include information the content conversion component 110 can use to perform text-to-speech. The digital voice print can include instructions for a text-to-speech engine. The content conversion component 110 can use any type of text-to-speech technology to render the text using the voice characteristics indicated by the digital voice print. For example, the content conversion component 110 can use neural network techniques to render the text using a human-like voice defined by the digital voice print.

The content conversion component 110 can generate a baseline audio track of the text rendered using the text-to-speech technique and based on the selected digital voice print. For example, the content conversion component 110 can include an audio cue generator 118 designed, constructed and operational to construct a baseline audio track of the digital component object with the text rendered by the digital voice. The audio cue generator 118 can use a text-to-speech engine to render or synthesize the text in accordance with the digital voice.

The content conversion component 110 can determine to add non-spoken audio cues to the baseline audio track. The audio cue generator 118 can be designed, configured and operational to generate non-spoken audio cues to add to the baseline audio track. Non-spoken cues can include or refer to sound effects. Non-spoken can include, for example, the sound of ocean waves, wind, leaves rustling, automobile engine, driving, airplane takeoff, crowd cheering, sports, action movie effects (e.g., high speed car chase, helicopters, etc.), running, biking, or other sound effects. Thus, non-spoken audio cues can refer to sounds or sound effects that lacks speech with words or numbers (e.g., spoken words).

The audio cue generator 118 can generate one or more non-spoken audio cues based on the text or metadata of the digital component object. The audio cue generator 118 can generate one or more non-spoken audio cues based on the digital voice selected for the text. The audio cue generator 118 can select the non-spoken audio cues based on the context of the computing device 140 (e.g., mode of transportation, type of computing device, type of application 152 executing in the foreground of the computing device 140, content being presented in the application 152, or request received from the computing device 140).

The audio cue generator 118 can select one or more non-spoken audio cues to add to the baseline audio track using an audio cues model 134 or audio cues data store. The audio cues 134 data store can include sound effects that are tagged with metadata, such as an indicator of that the sound effect is. For example, a sound effect for an ocean wave can be tagged with a description of the sound effect, such as "ocean weave." The audio cues 134 data store can include multiple types of ocean wave sound effects and include corresponding tags or descriptions distinguishing between each ocean wave.

In some cases, the audio cues can be configured or optimized for characteristics in the digital voices. Certain audio cues may be optimized for presentation as a background sound effect for a digital voice having a certain voice characteristic vector. An optimized sound effect can refer to a sound effect that can be rendered along with the rendering of the text with the digital voice without obstructing or distracting from the text, with the goal of the text being comprehendible by the user, thereby providing an improved user interface. For example, a sound effect with the same frequency and amplitude as the digital voice may make it challenging to perceive, discern or distinguish the digital voice over the sound effect, which can result in a degraded user experience and wasted computing resource utilization by providing output that is ineffective.

The audio cue generator 118 can perform image recognition on the visual digital component to identify a visual object in the digital component object. The audio cue generator 118 can ignore any text associated with the visual digital component, and perform image recognition to detect objects. The audio cue generator 118 can use any image processing technique or object detection technique. The audio cue generator 118 can use a model trained by the machine learning engine 122 and based on a training data set comprising images of objects that are tagged with a description of the object. The machine learning engine 122 can train a model with the training data so that the audio cue generator 118 can use the model to detect an object in a new image that is input into the model. The audio cue generator 118 can use the trained model to detect an image in a visual digital component object. Thus, the audio cue generator 118 can perform image recognition on the visual digital component object to identify a visual object in the digital component object. The audio cue generator 118 can select, from the non-spoken audio cues 134 stored in the data repository 124, the non-spoken audio cue corresponding to the visual object.

The audio cue generator 118 can also identify objects by accessing a link embedded in the visual digital component, such as a link to a landing web page corresponding to the digital component object. The audio cue generator 118 can parse the web page to identify visual objects as well as additional contextual information, keywords or metadata. The audio cue generator 118 can select audio cues based on the objects, contextual information, keywords or metadata. For example, the text of the landing webpage can include keywords "beach, vacation, cruise." The audio cue generator 118 can select audio cues corresponding to one or more of the keywords.

If the audio cue generator 118 identify multiple candidate audio cues based on the images in the visual object or other keywords or contextual information associated with metadata of the visual digital component or web pages linked to the digital component, the audio cue generator 118 can select one or more non-spoken audio cues. The audio cue generator 118 can use a policy to determine how many non-spoken audio cues to select. The policy can be to select all identified audio cues, randomly select a predetermined number of audio cues, alternate through the different audio cues throughout the audio track, overlay or mix one or more audio cues, or select a predetermined number of highest ranking audio cues.

For example, the audio cue generator 118 can identify the most prominent object in the visual digital component, and select an audio cue corresponding to the most prominent object. Prominence of an object can refer to the size of the object in the visual digital component (e.g., the biggest object in the visual digital component can be the most prominent object). Prominence can be based on the object being in the foreground of the image as opposed to being in the background. The audio cue generator 118 can identify the object in the visual digital component that is most relevant to the text generated by the text generator 114. Relevancy can be determined based on the description of the object and the text. For example, if the generated text includes the name of the object or keywords in the description of the object, then the object may be determined to be relevant to the text. The audio cue generator 118 can determine the keywords or concepts that are most relevant to the text, and select those keywords for the audio cue.

The audio cue generator 118 can rank the objects based on prominence, relevancy, or both prominence and relevancy. The audio cue generator 118 can determine to select one or more audio cues based on the rank. For example, the audio cue generator 118 can select the highest ranking audio cue, the top two highest ranking cues, the top three highest ranking cues, or some other number of audio cues.

In some cases, the audio cue generator 118 can take filter out, remove, or prevent an audio cue from being added to the baseline audio track based on the audio cue distracting from the text rendered by the digital voice. For example, the audio cue generator 118 can identify multiple visual objects in the digital component object via an image recognition technique. The audio cue generator 118 can identify, based on the metadata (e.g., metadata provided by the 3P digital content provider device 160 or keywords associated with a landing page corresponding to a link in the digital component object) and the text multiple non-spoken audio cues. The audio cue generator 118 can determine a matching score for each of the visual objects that indicates a level of match between each of the visual objects and the metadata. The audio cue generator 118 can use any matching technique to determine the matching score, such as relevancy, broad, phrase or exact matches. The audio cue generator 118 can use technique similar to the content selector component 108 to determine the matching score. The audio cue generator 118 can rank the non-spoken audio cues based on the matching score. In some cases, the audio cue generator 118 can select the highest one or more ranking audio cues.

In some cases, the audio cue generator 118 can select a highest ranking one or more audio cues that does not interfere, conflate, obstruct, or otherwise negatively impact the text synthesized using the digital voice. For example, the audio cue generator 118 can determine a level of audio interference between each of the non-spoken audio cues and the digital voice selected to render the text. The level of interference can be determined using one or more factors, such as amplitude, frequency, pitch, or timing, for example. In an illustrative example, a sound effect having the same frequency and amplitude as the synthesized text may cause a high level of interference that would prevent an end use from accurately perceiving the rendered text. In another example, the sound of a loud crash can distract from the text. However, the sound of a gentle breeze at a lower amplitude throughout the spoken audio track may not distract from the text.

To determine the level of interference, the audio cue generator 118 can determine the amount of interference caused by the non-spoken audio cue to the synthesized text. The amount can be a percentage of the text, a continuous duration, or a decibel level relative to the text. In some cases, the interference can be based on a signal-to-noise ratio or a ratio of text signal to non-spoken audio cue signal. The level of interference can be indicated using a grade (e.g., low, medium, or high), or numerical value (e.g., on a scale of 1 to 10 or any other scale where one end of the scale represent no interference and the opposite end of the scale represent total interference). Total interference can refer to destructive interference that may completely cancel out the synthesized text.

In some cases, the audio cue generator 118 can determine the level of interference by combining the audio waveforms corresponding to the synthesized text and the non-spoken audio cues and then processing the combined signal to determine whether an end user would be able to perceive the synthesized text. The audio cue generator 118 can use an audio processing technique similar to the interface 104 or natural language processor component 106 to validate, verify, or determine whether the synthesized text can be accurately perceived by the data processing system 102 itself, which can indicate whether an end user would be able to also actively perceive the audio track.

Upon identifying the audio cues that have a level of interference that is less than a predetermined threshold (e.g., low interference, an interference score of less than 5, 6, 7 or other metric), the audio cue generator 118 can select the highest ranking non-spoken audio cues having the level of audio interference less than the threshold.

The audio cue generator 118 can combine the selected non-spoken audio cues with the baseline audio track to generate an audio track of the digital component object. The audio track can correspond to an audio-only digital component object based on the visual digital component object. The audio cue generator 118 can use any audio mixing technique to combine the non-spoken cues with the baseline audio track. For example, the audio cue generator 118 can overlay the non-spoken audio cues over the baseline audio track, add the non-spoken audio cues as background audios, intersperse the non-spoken audio cues before or after the synthesized text, or in between the synthesized text. The data processing system 102 can include a digital mixing component configured to combine, change the dynamics, equalize or other change properties of two or more input audio signals to generate an audio track. The data processing system 102 can receive the non-spoken audio cues and the baseline audio track and sum the two signals to generate a combined audio track. The data processing system 102 can combine the input audio signals using a digital mixing process, thereby avoiding the introduction of unwanted noise or distortion.

Thus, once a baseline audio format is synthesized, the data processing system 102 can perform a second generation step of inserting non-spoken audio cues or backing tracks that can be determined from the metadata. For example, if the visual digital component looks like a beach resort with palm trees, then the data processing system 102 can synthesize audio of waves and wind moving tree leaves, and add the synthesized audio to the text-to-speech baseline audio track to generate an audio track.

In some cases, the action generator 136 can add predetermined or fixed audio to the baseline audio track or generated audio track with the non-spoken cues. For example, the data processing system 102 can determine, using a heuristic or rule-based technique, to add a phrase such as "Learn more about this on our website." This can prompt the user to then independently perform an action independent of the digital component object. The data processing system 102 can determine to automatically add the fixed audio based on historical performance information, the length of time of the audio track, or based on a configuration or setting (e.g., default setting set by an administrator of the data processing system 102, or a setting that can be provided by the 3P digital content provider device 160). In some cases, the fixed audio can include a prompt for voice input, such as "Would you like to learn more about this on our website?" The data processing system 102 can configure the audio digital component object to detect a trigger word in the response to the prompt, such as "yes" in this case, in order to then automatically perform a digital action corresponding to the prompt.

The data processing system 102 can provide the generated audio track to the computing device 140 to cause the computing device 140 to output or present the audio track via the speaker (e.g., transducer 144). In some cases, the data processing system 102 can add actionable commands to the audio track. The content conversion component 110 can include an action generator 136 designed, configured and operational to add a trigger word to the audio track. The trigger word can facilitate interacting with the audio track. The pre-processor 142 can listen for the trigger word, and then perform an action responsive to the trigger word. The trigger word can become a new wakeup or hot word that remains active for a predetermined time interval, such as during playback of the audio track and a predetermined amount of time after the audio track (e.g., 1 second, 2 seconds, 5 seconds, 10 seconds, 15 seconds or other appropriate time interval). Responsive to detection of the trigger word in an input audio signal detected by the microphone (e.g., sensor 148) of the computing device 140, data processing system 102 or the computing device 140 can perform a digital action corresponding to the trigger word.

In an illustrative example, the audio track can include an advertisement to purchase cruise tickets and take a vacation to an island with a beach. The audio track can include a prompt, such as "Would you like to know the price of the cruise tickets?" The trigger word can be "yes", or "what is the price", "how much does it cost" or some other variation that conveys an intent by the user to request the price of the tickets. The data processing system 102 can provide the trigger word to the computing device 140 or pre-processor 142 of the computing device 140 so that the pre-processor 142 can detect the trigger keyword in a subsequent voice input provided by the user. Responsive to detecting the trigger word in the voice input, the pre-processor 142 can forward the voice input to the data processing system 102. The NLP component 106 can parse the voice input and perform an action corresponding to the voice input, such as directed the user to a landing page associated with the digital component presented to the user or otherwise accessing and providing the requested information.

The trigger keyword can be linked to various digital actions. Example digital actions can include providing information, launching an application, launching a navigation application, playing music or video, ordering a product or service, controlling an appliance, controlling a lighting device, controlling an internet-of-things enabled device, ordering food from a restaurant, making a reservation, ordering a ride share, booking a ticket to a movie, booking flight tickets, controlling a smart television, or other digital action.

The action generator 136 can use one or more techniques to select an action for the digital component object. The action generator 136 can use a heuristic technique to select an action from a set of predetermined actions. The action generator 136 can use an action model 128 configured to receive the generated text as input and output a predicted action.

For example, the action generator 136 can determine a category of the digital component object. The category can refer to a vertical category, such as automobile, banking, sports, clothing, etc. The action generator 136 can perform a lookup or query a database with the category to retrieve one or more trigger words and digital actions established for the category. The database can include a mapping of categories to trigger keyword and digital actions. Table 2 illustrates an example mapping of categories to trigger words and actions.

TABLE 2

Illustrative Example of Mapping of Categories to Trigger Words and Digital Actions

| Category | Trigger Words | Digital Actions |
| --- | --- | --- |
| Ride Share | Yes; Ride; order a ride; go to | Launch a ride share application on the computing device 140; order the ride to pick the user up. |
| Travel | Book a flight; check flight price; how much to go to [city]; when is the next flight to [city] | Provide options to book flight; launch a flight booking application; search for flights and provide results; |
| Vehicle Shopping | How much does the car cost; what options are available for the car; where is the nearest dealership; | Access landing page of content item provider; provide requested information; launch navigation application with directions to nearest auto dealership |

Table 2 illustrates an example mapping of categories to trigger words and digital actions. As illustrated in Table 2, categories can include ride share, travel, and vehicle shopping. The action generator 136 can determine the category of the selected digital component object based on the text generated for the digital component object, metadata associated with the digital component object, or parsing data associated with links embedded in the digital component object. In some cases, the 3P digital content provider device 160 can provide the category information along with the metadata. In some cases, the action generator 136 can use a semantic processing technique to determine the category based on the information associated with the digital component object.

The action generator 136, upon identifying or determining the category for the digital component object, can perform a lookup or query the mapping (e.g., Table 2). The action generator 136 an retrieve, from the mapping, one or more trigger words corresponding to one or more digital actions associated with the category. For example, if the action generator 136 identifies the category as "Ride Share", the action generator 136 can retrieve, responsive to the query or lookup, trigger keywords "Yes", "Ride", "order a ride", or "go to". The action generator 136 can further identify digital actions: launch a ride share application on the computing device 140; or order the ride to pick the user up. The action generator 136 can configure the audio digital component object with instructions to detect all of the trigger keywords and perform the corresponding digital actions responsive to detection of the trigger keyword.

In some cases, the action generator 136 can determine to add one or more, but not all, of the retrieved trigger keywords and digital actions to the digital component object. For example, the action generator 136 can rank, using a digital action model 128 trained based on historical performance of trigger keywords, the trigger words based on the context of the digital component object and the type of the client device. The action generator 136 can select a highest ranking trigger keyword to add to the audio track.

The action model 128 can be trained by machine learning engine 122 using training data. The training data can include historical performance information associated with the trigger keyword. The historical performance information can include, for each trigger keyword, whether the trigger keywords resulted in an interaction (e.g., did the computing device 140 detect the trigger keyword in a voice input received subsequent to presentation of the audio track), context information associated with the digital component object (e.g., category, keywords, concepts, or state in an interaction flow), and context information of the interaction. The context of the computing device 140 can include, for example, the type of computing device 140 (e.g., mobile device, laptop device, smartphone, or smart speaker), available interfaces of the computing device 140, mode of transportation (e.g., walking, driving, stationary, biking, etc.), or location of the computing device 140. For example, if the mode of transportation is running, biking, or driving, the data processing system 102 can select a type of interaction that may not require visual or touch input, and can result in audio output in order to improve the user experience.

The machine learning engine 122 can train the action model 128 based on this training data such that the action model 128 can predict a trigger keyword that is most likely to result in an interaction based on the context of the digital component object and the computing device 140. Thus, the action generator 136 can customize or tailor the action to add to the digital component object in a real-time process to provide the trigger keyword that is most likely to result in an interaction. By limiting the number of trigger keywords to those that are most likely to result in an interaction as determined by the action model 128, the action generator 136 can improve the likelihood that the pre-processor 142 or NLP component 106 accurately and reliably detects the trigger keyword, while reducing the likelihood that the user of the computing device 140 inadvertently causes performance of an unwanted action. Further, by limiting the number of trigger words, the action generator 136 can reduce network bandwidth communication and computing resource utilization by reducing the number commands or data packets transmitted via network 105, as well as reducing the number of trigger words the pre-processor 142 processes.

The data processing system 102 can provide the audio track of the digital component object to the computing device 140 for output via a speaker of the computing device 140. In some cases, the data processing system 102 can determine an insertion point for the audio track of the digital component object. An insertion point can refer to a point in time relative to an audio output of the computing device 140. The audio output can correspond to digital streaming music, or other audio (or audio-visual) output provided via an application 152 executing on the computing device 140. The data processing system 102 can determine an insertion time so as to prevent obfuscation or distortion of the main audio content being output by the computing device 140, while improving the user experience and likelihood that the generated audio track is perceived by the end user and ultimately receives an interaction.

The data processing system 102 can include a content insertion component 120 designed, constructed and operational to identify an insertion point for the audio track. The content insertion component 120 can identify an insertion point for the audio track in a digital media stream output by the computing device 140. The content insertion component 120 can identify the insertion point using an insertion model 130. The machine learning engine 122 can train the insertion model 130 using historical performance data. The historical performance data can include or be referred to as training data. The historical performance data used to train the insertion model 130 can include data about historical insertion points for audio tracks inserted in digital media streams. The data can indicate when the audio track was inserted, contextual information about the audio track, contextual information about the digital media stream, whether the user interacted with the audio track, how the user interacted with the audio track (e.g., what action the user took, or whether the interaction was positive or negative), or contextual information about the computing device 140 (e.g., type of computing device, available interfaces of the computing device, or location of the computing device).

The machine learning engine 122 can train the insertion model 130 using this training data. The machine learning engine 122 can use any technique to train the insertion model 130 so that the insertion model 130 can be used to predict when to insert the audio track generated based on the visual digital component object in a digital content stream (e.g., streaming music, news, podcasts, videos, or other media)

The content insertion component 120 can identify, based on a insertion model 130 trained using historical performance data, an insertion point. The insertion point can be, for example, after a current streamlining media segment and prior to the beginning of the next segment. Each segment can correspond to another song. In another example, such as a podcast, the content insertion component 120 can determine, using the insertion model 130, to insert the audio track during a segment. The content insertion component 120 can insert the audio track after the segment begins and before the segment ends. For example, the segment can have a duration of 30 minutes, and the content insertion component 120 can determine, using the insertion model 130, to insert the audio track after 15 minutes of the segment playing.

The content insertion component 120 can determine a custom insertion point based on the current context (e.g., context of the generated audio track, streaming media, and computing device 140). The content insertion component 120 can determine the custom insertion point in real-time. The content insertion component 120 can determine a different insertion point for a first computing device 140 as compared to a second computing device 140 if the first and second computing devices are different types of computing devices (e.g., laptop versus smart speaker). The content insertion component 120 can determine different insertion points for the first computing device 140 and the second computing device 140 based on a mode of transportation associated with the different computing devices (e.g., walking versus driving versus stationary).

The content insertion component 120 can determine to insert the audio track proximate to a keyword, term or concept in the digital media stream. The content insertion component 120 can monitor the digital media stream to detect a trigger word in the digital media stream that is relevant to the audio track, and then determine to insert the audio-only digital component object subsequent to or responsive to the trigger word detected in the digital media stream.

The content insertion component 120 can obtain a copy of the segment of the digital media stream from the 3P electronic resource server 162. The content insertion component 120 can parse the segment of the digital media stream to identify all tokens (e.g., keywords, topics, or concepts) and sentences in the segment. The content insertion component 120 can determine a relevancy score for each tokens and sentence to determine how relevant the token or sentence is to the digital component object. The content insertion component 120 can select the token having the highest relevancy score, and then provide the audio-only digital component object for insertion adjacent to the selected token (e.g., before or after the token is presented).

In some cases, the content insertion component 120 can identify all tokens in the segment of digital media and execute a Monte Carlo simulation in which the audio track is inserted adjacent to each token. The content insertion component 120 can input the variations into a neural network engine to determine which insertion point sounds the best. The neural network can be trained based on training data that includes human rated audio tracks inserted in digital media streams using a machine learning technique. For example, the content insertion component 120 can use the insertion model 130 to determine an insertion point. The training data can include human raters that grade digital media streams with audio tracks at an insertion point. Grades can be binary, such as good or bad, or can be a score on a scale (e.g., 0 to 10 with 10 indicating the best sounding track and 0 indicating the worst sounding track, for example).

In some cases, the content insertion component 120 can use a heuristic technique to determine an insertion point for the generated audio track. The heuristic technique can be different based on the type of digital media stream. If the content of the digital media stream is songs, then the heuristic rule can be to insert the generated audio track after the song is done playing. If the content of the digital media stream is a podcast, then the heuristic rule can be to insert the audio track after a sentence containing a relevant token.

Upon selecting an insertion point, the data processing system 102 can provide an instruction to the computing device 140 to cause the computing device 140 to render the audio track at the insertion point in the digital media stream.

Figure 2:
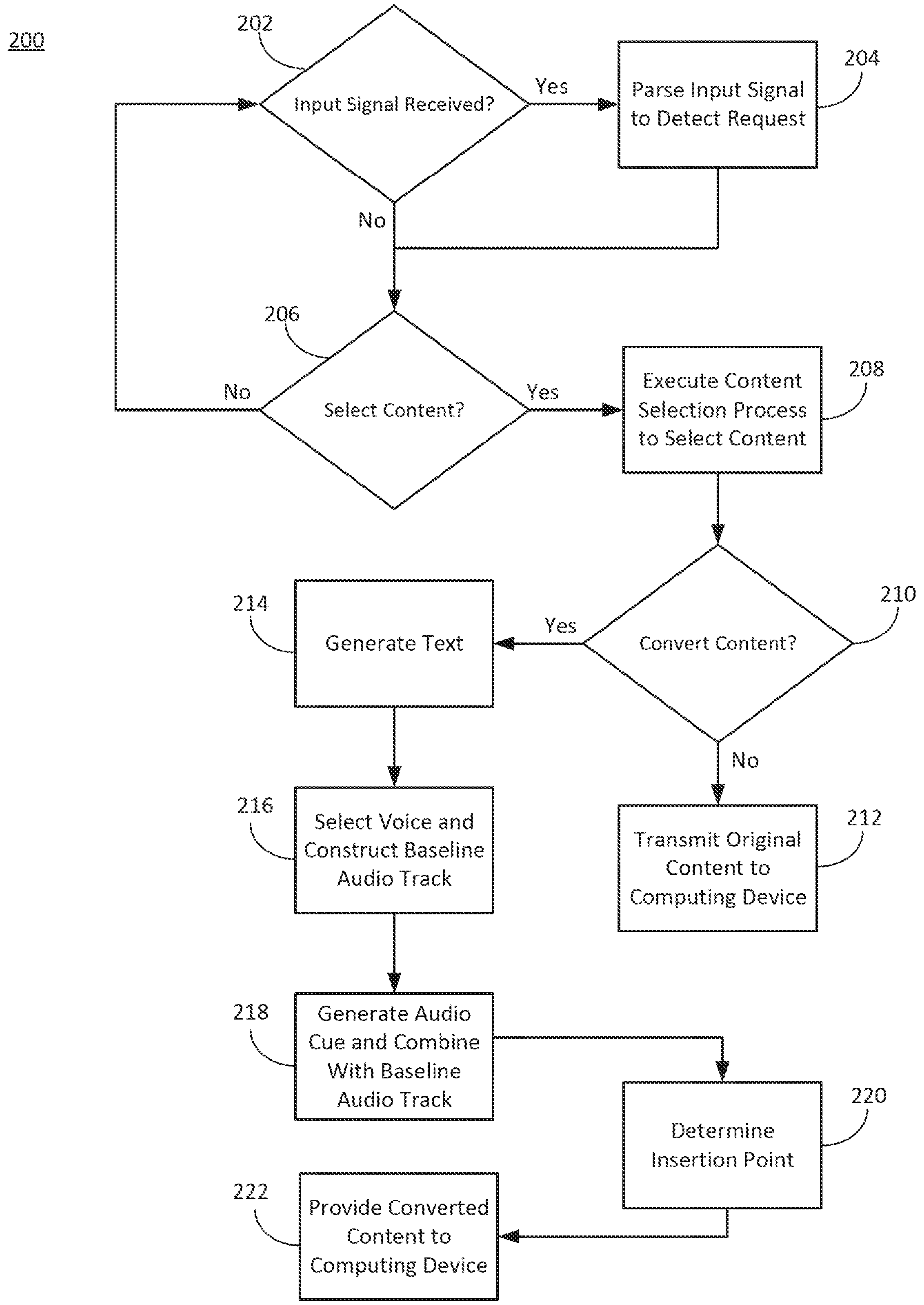
FIG. 2 is an illustration of a method of generating audio tracks, in accordance with an implementation.

FIG. 2 is an illustration of a method of generating audio tracks, in accordance with an implementation. The method 200 can be performed by one or more system, component or module depicted in FIG. 1 or 3, including, for example, a data processing system, interface, content selector component, natural language processor component, content conversion component, or computing device. At decision block 202, a data processing system can determine whether an input signal has been received. The input signal can correspond to voice input detected by a computing device remote from the data processing system. The input signal can include data packets conveying an audio input signal, such as voice input detected by a microphone of the computing device. The data processing system can receive the input signal via an interface of the data processing system. The data processing system can receive the input signal from a computing device via a network.

If, at decision block 202, the data processing system determine that an input signal was received, the data processing system can proceed to ACT 204 to parse the input signal and detect a request. The data processing system can use a natural language processing technique to parse the input signal and detect one or more keywords, terms, concepts, phrases or other information in the input signal.

The data processing system can proceed to decision block 206 to determine whether to select content. Selecting content can refer to performing a real-time content selection process to select digital component objects provided by third-party digital component providers. Selecting content can refer to performing a real-time online auction using content selection criteria provided by the third-party digital component providers.

The data processing system can determine, at decision block 206, to select content if the data processing system detects a request for content at ACT 204 in the input signal. In the event the data processing system determines, at decision block 202, that an input signal was not received, the data processing system can also decide to select content at decision block 206. For example, the data processing system can proactively determine to perform an online content selection process and push a digital component object to the computing device without receiving an explicit request for digital component objects from the computing device. The data processing system can identify a presentation opportunity (e.g., in between media segments or songs) in a digital music stream output by the computing device and automatically determine to provide a digital component object at this opportunity. Thus, in some cases the data processing system can receive a request for content and then perform the content selection process, while in other cases the data processing system may not receive a content but proactively determine to perform the content selection process. In the even the data processing system receives a request for content, the request can be for main content (e.g., search results responsive to a query in the input audio signal), and the data processing system can perform the online auction to select supplementary content (e.g., digital component objects corresponding to advertisements) that can be responsive to the request, but different from the organic search results that are directly responsive to the input query.

If, at decision block 206, the data processing system determines not to perform the content selection process to select a digital component object of a 3P digital component provider, the data processing system can return to decision block 202 to determine whether an input signal was received. If, however, the data processing system determines, at decision block 206, to select content, the data processing system can proceed to ACT 208 to execute a content selection process to select content. The data processing system (e.g., via a content selector component) can select a digital component object using content selection criteria or other contextual information associated with the input request, computing device, or digital streaming content.

The data processing system can select digital component objects having a format, such as a visual-only digital component object configured for display via a display device of the computing device, an audio-only digital component object configured for playback via a speaker of the computing device, or an audio-visual digital component that is configured for output via both the display and speaker of the computing device.

At decision block 210, the data processing system can determine whether to convert the selected digital component into a different format. For example, if the selected digital component object is in a visual-only format, the data processing system can determine whether to provide the digital component object to the computing device in the visual format for presentation via a display device of the computing device, or to convert the digital component object into a different format for presentation via a different output interface of the computing device, such as a speaker.

The data processing system (e.g., a format selector) can determine whether to convert the digital component object. The data processing system can make the determination based on the available interfaces of the computing device, the primary interfaces of the computing device, the context of the computing device (e.g., mode of transportation), the type of computing device or other factors. If, at decision block 210, the data processing system determines not to convert the selected digital component object into a different format, the data processing system can proceed to ACT 212 and transmit the selected digital component object in its original format to the computing device.

If, however, the data processing system determines, at decision block 210, to convert the digital component object into a different format, the data processing system can proceed to ACT 214 to generate text. For example, if the original format is a visual-only format, and the data processing system determines to convert the digital component into an audio-only format, the data processing system can proceed to ACT 214 to generate text for the visual digital component object. The data processing system (e.g., via a text generator) can use a natural language generation technique to generate the text based on the visual digital component object. The data processing system can generate the text based on only the visual content of the digital component object. The visual content can refer to images. In some cases, the data processing system can generate text based on metadata associated with the visual digital component object.

At ACT 216, the data processing system can select a digital voice to use to synthesize or render the text. The data processing system can use the selected digital voice to perform a text-to-speech conversion of the generated text. The data processing system can select the digital voice based on the generated text, context information associated with the digital component object (e.g., keywords, topics, concepts, vertical category), metadata, context information associated with the computing device. The data processing system can use a model trained based on a machine learning technique and historical data to select the digital voice to use to synthesize the generated text. For example, the data processing system can input into the model the contextual information associated with the digital component object (e.g., metadata) and the model can output a voice characteristics vector. The voice characteristics vector can indicate a gender, speech rate, intonations, loudness, or other characteristics.

The data processing system can select a digital voice that matches the voice characteristics vector. The data processing system can construct a baseline audio track using the selected digital voice. The data processing system can construct the baseline audio track as indicated by the voice characteristics vector. For example, the digital voice can include fixed characteristics, such as gender, as well as dynamic characteristics, such as speech rate, intonations, or loudness. The dynamic characteristics can vary on a per-syllable basis. The data processing system can use a text-to-speech engine configured to synthesize the text using the fixed and dynamic characteristics corresponding to the voice characteristics vector on a per-syllable basis.

At ACT 218, the data processing system can generate a non-spoken audio cue. The data processing system can combine the non-spoken audio cue with the baseline audio track generated at ACT 216. To generate the non-spoken audio cue, the data processing system (e.g., via an audio cue generator) can identify objects in the visual digital component. The data processing system can only identify visual components. The data processing system can identify both visual and text-components (e.g., metadata associated with the digital component object). Upon identifying the objects, the data processing system can identify audio cues that identify or indicate the object. For example, if the data processing system identifies ocean waves and palm trees, the data processing system can select wave sounds and the sound of a breeze going through leaves.

The data processing system can combine the selected audio cues with the baseline audio track using any audio mixing technique. The data processing system can add the non-spoken audio cues at a portion of the baseline audio track or throughout the audio track. The data processing system can add the non-spoken audio cues to the baseline track in a manner that does not distort or obfuscate the spoken text in the baseline audio track, thereby improving the user experience. In some cases, the data processing system can simulate the combined audio track and test the quality. For example, the data processing system can simulate receiving the combined audio track and performing natural language processing on the combined audio track. The data processing system can validate whether the NLP component of the data processing system was able to accurately detect the spoken text by comparing the parsed text with the text generated by the text generator of the data processing system. If the data processing system is unable to accurately decipher the text in the combined audio track, the data processing system can determine that the non-spoken audio cues would have a negative impact on the spoken text and preclude an end user from accurately identifying the spoken text. Thus, in an effort to improve the user experience, the data processing system can remove one or more of the non-spoken audio cues, and then re-generate and re-test the combined audio track. The data processing system can perform this removal of non-spoken audio cues and re-generation and re-testing until the data processing system can accurately interpret the spoken text. Responsive to determining that the spoken text in the combined audio track would be perceptible, the data processing system can approve the combined audio track for presentation.

In some cases, the data processing system can transmit the combined audio track to the computing device for presentation. In some cases, the data processing system can proceed to ACT 220 to determine an insertion point for the audio track. The data processing system can use an insertion model trained via a machine learning technique and historical data to determine where to insert the audio track in a digital media stream being output by the computing device. The data processing system can determine an insertion point that reduces computing resource utilization, network bandwidth consumption, avoids latency or delays in the digital media stream, or improves the user experience. For example, the data processing system can determine to insert the audio track at the beginning, during, or after a segment of the digital media stream.

Upon determining an insertion point, the data processing system can proceed to ACT 222 and provide the converted content (or audio-only digital component object) to the computing device to cause the computing device to render, play, or otherwise present the converted digital component. In some cases, the data processing system can configure the converted digital component to invoke, initiate, or perform digital actions. For example, the data processing system can provide instruction to configure the computing device or data processing system to detect trigger words in subsequent voice input from a user, and then perform a digital action responsive to the trigger words.

In some cases, the data processing system may not receive a request for content. For example, the data processing system can proactively identify keywords associated with digital streaming content rendered by a computing device. The data processing system can determine, at decision block 206, to select content responsive to the keywords. The data processing system can then select, based on the keywords, a digital component object having a visual output format. The data processing system can determine, based on a type of the computing device, to convert the digital component object into an audio output format. The data processing system can generate, responsive to the determination to convert the digital component object into the audio output format, text for the digital component object. The data processing system can select, based on context of the digital component object, a digital voice to render the text. The data processing system can construct a baseline audio track of the digital component object with the text rendered by the digital voice. The data processing system can generate, based on the digital component object, non-spoken audio cues. The data processing system can combine the non-spoken audio cues with the baseline audio form of the digital component object to generate an audio track of the digital component object. The data processing system can provide the audio track of the digital component object to the computing device for output via a speaker of the computing device.

Figure 3:
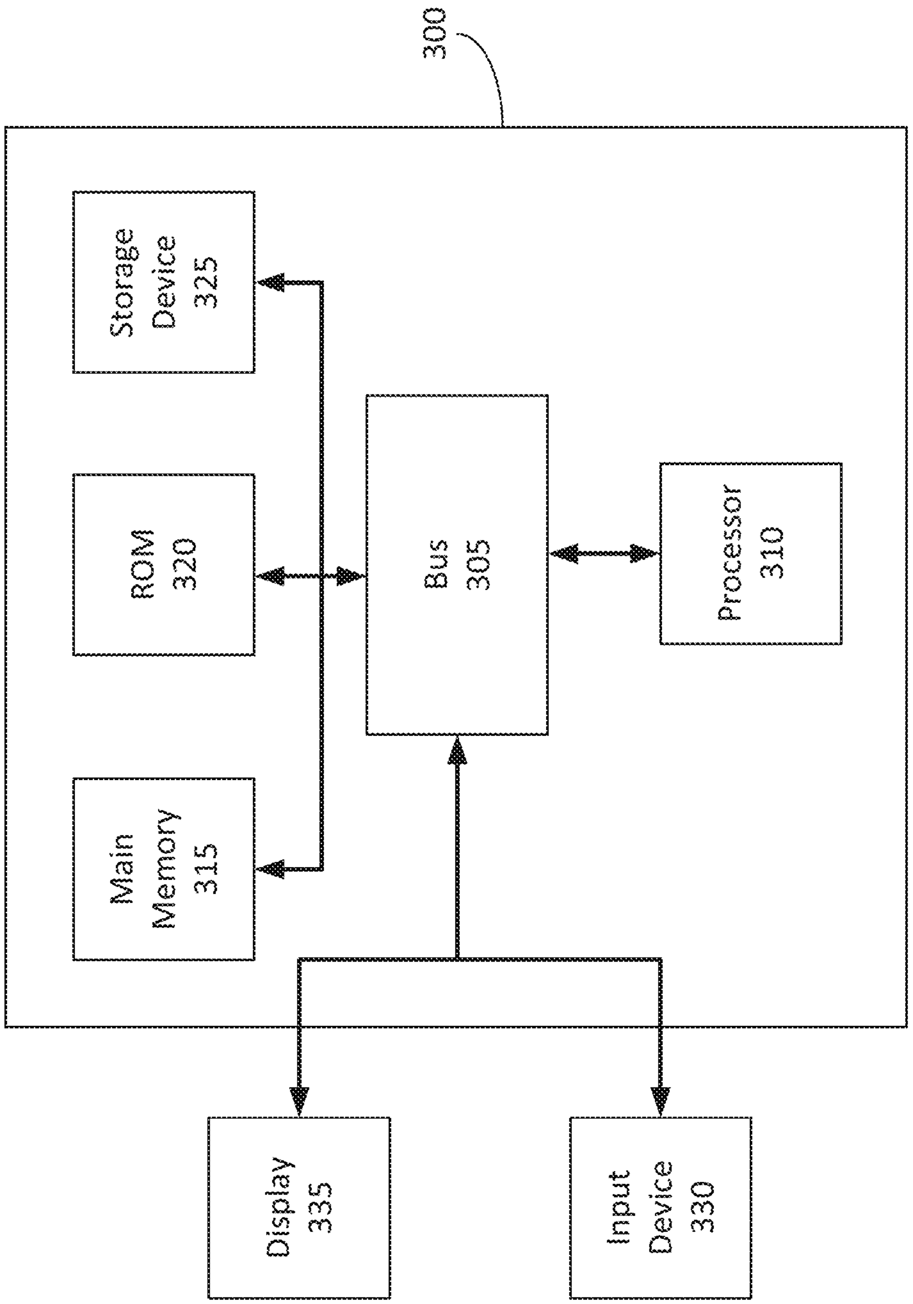
FIG. 3 is a block diagram illustrating a general architecture for a computer system that can be employed to implement elements of the system depicted in FIG. 1 and method depicted in FIG. 2.

FIG. 3 is a block diagram of an example computer system 300. The computer system or computing device 300 can include or be used to implement the system 100, or its components such as the data processing system 102. The computing system 300 includes a bus 305 or other communication component for communicating information and a processor 310 or processing circuit coupled to the bus 305 for processing information. The computing system 300 can also include one or more processors 310 or processing circuits coupled to the bus for processing information. The computing system 300 also includes main memory 315, such as a random access memory (RAM) or other dynamic storage device, coupled to the bus 305 for storing information, and instructions to be executed by the processor 310. The main memory 315 can be or include a data repository. The main memory 315 can also be used for storing position information, temporary variables, or other intermediate information during execution of instructions by the processor 310. The computing system 300 may further include a read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions. The storage device 325 can include or be part of the data repository.

The computing system 300 may be coupled via the bus 305 to a display 335, such as a liquid crystal display, or active matrix display, for displaying information to a user. An input device 330, such as a keyboard including alphanumeric and other keys, may be coupled to the bus 305 for communicating information and command selections to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335. The display 335 can be part of the data processing system 102, the client computing device 140 or other component of FIG. 1, for example.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

In situations in which the systems described herein collect personal information about users or applications installed on a user device, or make use of personal information, the users are provided with an opportunity to control whether programs or features collect user information (e.g., information about a user's social network, social actions, or activities, profession, a user's preferences, or a user's current location). In addition or in the alternative, certain data can be treated in one or more ways before it is stored or used, so that personal information is removed.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The natural language processor component 106, and other data processing system 102 or data processing system 102 components can include or share one or more data processing apparatuses, systems, computing devices, or processors. The content conversion component 110 and content selector component 108, for example, can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 300 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the interface 104 of the data processing system 102).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the content conversion component 110 and the content insertion component 120 can be a single component, app, or program, or a logic device having one or more processing circuits, or executed by one or more processors of the data processing system 102.

At least one aspect of this technical solution is directed to a system to generate audio tracks. The system can include a data processing system. The data processing system can include one or more processors. The data processing system can receive, via a network, data packets comprising an input audio signal detected by a microphone of a computing device remote from the data processing system. The data processing system can parse the input audio signal to identify a request. The data processing system can select, based on the request, a digital component object having a visual output format, the digital component object associated with metadata. The data processing system can determine, based on a type of the computing device, to convert the digital component object into an audio output format. The data processing system can generate, responsive to the determination to convert the digital component object into the audio output format, text for the digital component object. The data processing system can select, based on context of the digital component object, a digital voice to render the text. The data processing system can construct a baseline audio track of the digital component object with the text rendered by the digital voice. The data processing system can generate, based on the metadata of the digital component object, non-spoken audio cues. The data processing system can combine the non-spoken audio cues with the baseline audio form of the digital component object to generate an audio track of the digital component object. The data processing system can provide, responsive to the request from the computing device, the audio track of the digital component object to the computing device for output via a speaker of the computing device.

The data processing system can determine to convert the digital component object into the audio output format based on the type of the computing device comprising a smart speaker. The data processing system can determine to convert the digital component object into the audio output format based on the type of the computing device comprising a digital assistant.

The data processing system can select, responsive to the request, the digital component object based on content selection criteria input into a real-time content selection process, the digital component object selected from a plurality of digital component objects provided by a plurality of third-party content providers. The data processing system can select the digital component object based on keywords associated with content rendered by the computing device prior to the request. The digital component object can be selected from a plurality of digital component objects provided by a plurality of third-party content providers.

The data processing system can generate, via a natural language generation model, the text for the digital component object based on the metadata of the digital component object. The data processing system can select, via a voice model, the digital voice based on context of the digital component object. The voice model can be trained by a machine learning technique with a historical data set comprising audio and visual media content.

The data processing system can input the context of the digital component object into a voice model to generate a voice characteristics vector. The voice model can be trained by a machine learning engine with a historical data set comprising audio and visual media content. The data processing system can select the digital voice from a plurality of digital voices based on the voice characteristics vector.

The data processing system can determine, based on the metadata, to add a trigger word to the audio track. Responsive to detection of the trigger word in a second input audio signal causes the data processing system or the computing device to perform a digital action corresponding to the trigger word.

The data processing system can determine a category of the digital component object. The data processing system can retrieve, from a database, a plurality of trigger words corresponding to a plurality of digital actions associated with the category. The data processing system can rank, using a digital action model trained based on historical performance of trigger keywords, the plurality of trigger words based on the context of the digital component object and the type of the computing device. The data processing system can select a highest ranking trigger keyword to add to the audio track.

The data processing system can perform image recognition on the digital component object to identify a visual object in the digital component object. The data processing system can select, from a plurality of non-spoken audio cues stored in a database, the non-spoken audio cue corresponding to the visual object.

The data processing system can identify a plurality of visual objects in the digital component object via an image recognition technique. The data processing system can select, based on the plurality of visual objects, a plurality of non-spoken audio cues. The data processing system can determine a matching score for each of the visual objects that indicates a level of match between each of the visual objects and the metadata. The data processing system can rank the plurality of non-spoken audio cues based on the matching score. The data processing system can determine a level of audio interference between each of the plurality of non-spoken audio cues and the digital voice selected based on the context to render the text. The data processing system can select, based on a highest rank, the non-spoken audio cue from the plurality of non-spoken audio cues associated with the level of audio interference less than a threshold.

The data processing system can identify, based on a insertion model trained using historical performance data, an insertion point for the audio track in a digital media stream output by the computing device. The data processing system can provide instruction to the computing device to cause the computing device to render the audio track at the insertion point in the digital media stream.

At least one aspect of this technical solution is directed to a method of generating audio tracks. The method can be performed by one or more processors of a data processing system. The method can include the data processing system receiving data packets comprising an input audio signal detected by a microphone of a computing device remote from the data processing system. The method can include the data processing system parsing the input audio signal to identify a request. The method can include the data processing system selecting, based on the request, a digital component object having a visual output format, the digital component object associated with metadata. The method can include the data processing system determining, based on a type of the computing device, to convert the digital component object into an audio output format. The method can include the data processing system generating, responsive to the determination to convert the digital component object into the audio output format, text for the digital component object. The method can include the data processing system selecting, based on context of the digital component object, a digital voice to render the text. The method can include the data processing system constructing a baseline audio track of the digital component object with the text rendered by the digital voice. The method can include the data processing system generating, based on the digital component object, non-spoken audio cues. The method can include the data processing system combining the non-spoken audio cues with the baseline audio form of the digital component object to generate an audio track of the digital component object. The method can include the data processing system providing, responsive to the request from the computing device, the audio track of the digital component object to the computing device for output via a speaker of the computing device.

The method can include the data processing system determining to convert the digital component object into the audio output format based on the type of the computing device comprising a smart speaker. The method can include the data processing system selecting, responsive to the request, the digital component object based on content selection criteria input into a real-time content selection process, the digital component object selected from a plurality of digital component objects provided by a plurality of third-party content providers.

The method can include the data processing system selecting the digital component object based on keywords associated with content rendered by the computing device prior to the request. The digital component object can be selected from a plurality of digital component objects provided by a plurality of third-party content providers.

At least one aspect of this technical solution is directed to a system to generate audio tracks. The system can include a data processing system with one or more processors. The data processing system can identify keywords associated with digital streaming content rendered by a computing device. The data processing system can select, based on the keywords, a digital component object having a visual output format, the digital component object associated with metadata. The data processing system can determine, based on a type of the computing device, to convert the digital component object into an audio output format. The data processing system can generate, responsive to the determination to convert the digital component object into the audio output format, text for the digital component object. The data processing system can select, based on context of the digital component object, a digital voice to render the text. The data processing system can construct a baseline audio track of the digital component object with the text rendered by the digital voice. The data processing system can generate, based on the digital component object, non-spoken audio cues. The data processing system can combine the non-spoken audio cues with the baseline audio form of the digital component object to generate an audio track of the digital component object. The data processing system can provide the audio track of the digital component object to the computing device for output via a speaker of the computing device.

The data processing system can determine to convert the digital component object into the audio output format based on the type of the computing device comprising a smart speaker. The data processing system can select the digital component object based on the keywords input into a real-time content selection process, the digital component object selected from a plurality of digital component objects provided by a plurality of third-party content providers.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, devices, products or services described as 3P or third party such as the 3P digital content provider device 160 can be or include, partially or entirely, first party devices, products or services, and can be commonly owned by an entity associated with the data processing system 102 or other components. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A data processing system comprising one or more processors to:

receive, via a network and from a computing device, data packets indicating a request;

select, based on the request, a digital component object having a visual output format, the digital component object associated with metadata;

determine to convert the digital component object into an audio output format;

obtain, responsive to the determination to convert the digital component object into the audio output format, text for the digital component object;

select, based on context of the digital component object, a digital voice to render the text;

construct a baseline audio track of the digital component object with the text rendered by the digital voice;

generate, based on the digital component object, non-spoken audio cues;

combine the non-spoken audio cues with the baseline audio form of the digital component object to generate an audio track of the digital component object; and provide, responsive to the request from the computing device, the audio track of the digital component object to the computing device for output via a speaker of the computing device.

2. The data processing system of claim 1, comprising the one or more processors to:

determine, for the digital component object, a type of action or interaction.

3. The data processing system of claim 2, comprising the one or more processors to:

configure the digital component object for the determined type of action or interaction.

4. The data processing system of claim 3, comprising the one or more processors to:

add an actionable command to the audio track to facilitate interaction with the audio track.

5. The data processing system of claim 4, comprising the one or more processors to:

add a trigger word to the audio track, wherein the trigger word remains active for a predetermined time interval.

6. The data processing system of claim 5, wherein the predetermined time interval comprises playback of the audio track.

7. The data processing system of claim 5, wherein the predetermined time interval comprises a predetermined amount of time after the audio track.

8. The data processing system of claim 1, comprising the one or more processors to:

generate, via a natural language generation model, the text for the digital component object based on the metadata of the digital component object.

9. The data processing system of claim 1, comprising the one or more processors to:

input the context of the digital component object into a voice model to generate a voice characteristics vector, the voice model trained by a machine learning engine with a historical data set comprising audio and visual media content; and select the digital voice from a plurality of digital voices based on the voice characteristics vector.

10. A method comprising:

receiving, by a data processing system and via a network and from a computing device, data packets indicating a request;

selecting, by the data processing system and based on the request, a digital component object having a visual output format, the digital component object associated with metadata;

determining, by the data processing system, to convert the digital component object into an audio output format;

obtaining, by the data processing system and responsive to the determination to convert the digital component object into the audio output format, text for the digital component object;

selecting, by the data processing system and based on context of the digital component object, a digital voice to render the text;

constructing, by the data processing system, a baseline audio track of the digital component object with the text rendered by the digital voice;

generating, by the data processing system and based on the digital component object, non-spoken audio cues;

combining, by the data processing system, the non-spoken audio cues with the baseline audio form of the digital component object to generate an audio track of the digital component object; and providing, by the data processing system and responsive to the request from the computing device, the audio track of the digital component object to the computing device for output via a speaker of the computing device.

11. The method of claim 10, comprising:

determining, by the data processing system and for the digital component object, a type of action or interaction.

12. The method of claim 11, comprising:

configuring, by the data processing system, the digital component object for the determined type of action or interaction.

13. The method of claim 12, comprising:

adding, by the data processing system, an actionable command to the audio track to facilitate interaction with the audio track.

14. The method of claim 13, comprising:

adding, by the data processing system, a trigger word to the audio track, wherein the trigger word remains active for a predetermined time interval.

15. The method of claim 14, wherein the predetermined time interval comprises playback of the audio track.

16. The method of claim 14, wherein the predetermined time interval comprises a predetermined amount of time after the audio track.

17. The method of claim 10, comprising:

generating, by the data processing system and via a natural language generation model, the text for the digital component object based on the metadata of the digital component object.

18. The method of claim 10, comprising:

inputting, by the data processing system, the context of the digital component object into a voice model to generate a voice characteristics vector, the voice model trained by a machine learning engine with a historical data set comprising audio and visual media content; and selecting, by the data processing system, the digital voice from a plurality of digital voices based on the voice characteristics vector.

19. One or more non-transitory computer-readable media storing instructions that are executable to cause a data processing system to:

receive, via a network and from a computing device, data packets indicating a request;

select, based on the request, a digital component object having a visual output format, the digital component object associated with metadata;

determine to convert the digital component object into an audio output format;

obtain, responsive to the determination to convert the digital component object into the audio output format, text for the digital component object;

select, based on context of the digital component object, a digital voice to render the text;

construct a baseline audio track of the digital component object with the text rendered by the digital voice;

generate, based on the digital component object, non-spoken audio cues;

combine the non-spoken audio cues with the baseline audio form of the digital component object to generate an audio track of the digital component object; and provide, responsive to the request from the computing device, the audio track of the digital component object to the computing device for output via a speaker of the computing device.

20. The one or more non-transitory computer-readable media of claim 19, wherein the instructions are executable to cause the data processing system to:

determine, for the digital component object, a type of action or interaction; and configure the digital component object for the determined type of action or interaction.

* * * * *